US012347317B2

United States Patent
Di Cairano et al.

(10) Patent No.: US 12,347,317 B2
(45) Date of Patent: Jul. 1, 2025

(54) SYSTEM AND METHOD FOR JOINTLY CONTROLLING CONNECTED AUTONOMOUS VEHICLES (CAVs) AND MANUAL CONNECTED VEHICLES (MCVs)

(71) Applicant: Mitsubishi Electric Research Laboratories, Inc., Cambridge, MA (US)

(72) Inventors: Stefano Di Cairano, Newton, MA (US); Roya Firoozi, Albany, CA (US); Rien Quirynen, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 535 days.

(21) Appl. No.: 17/656,919

(22) Filed: Mar. 29, 2022

(65) Prior Publication Data

US 2023/0316920 A1    Oct. 5, 2023

(51) Int. Cl.
*G08G 1/16* (2006.01)
*B60W 30/09* (2012.01)
(Continued)

(52) U.S. Cl.
CPC .............. *G08G 1/163* (2013.01); *B60W 30/09* (2013.01); *B60W 30/18159* (2020.02);
(Continued)

(58) Field of Classification Search
CPC .................. G08G 1/163; G08G 1/0116; G08G 1/096758; G08G 1/0112; G08G 1/0145;
(Continued)

(56) References Cited

U.S. PATENT DOCUMENTS

| 9,129,519 B2 * | 9/2015 | Aoude ................. G08G 1/00 |
| 10,181,263 B2 * | 1/2019 | Xu ..................... G08G 1/0133 |

(Continued)

FOREIGN PATENT DOCUMENTS

CN    114265398 A  *  4/2022

OTHER PUBLICATIONS

CN-114265398-A machine translation (Year: 2022).*

(Continued)

*Primary Examiner* — Angelina M Shudy
(74) *Attorney, Agent, or Firm* — Gene Vinokur

(57) ABSTRACT

The present disclosure provides a system and a method for jointly controlling one or multiple connected autonomous vehicles (CAVs) and one or multiple manual connected vehicles (MCVs) moving to form traffic on the same or intersecting roads. The method includes collecting states of each of the CAVs, each of the MCVs, and each of traffic signs regulating the traffic, and solving a multi-variable mixed-integer problem (MIP) optimizing a cost function for values of control commands changing states of each CAV and values of control commands changing states of each of the traffic signs. The cost function is optimized subject to a motion model of each of the CAVs, subject to constraints modeling general traffic rules, subject to timing constraints, and subject to a motion model of each MCV. The method further includes transmitting the optimized values of the control commands to the corresponding CAVs and corresponding traffic signs.

20 Claims, 11 Drawing Sheets

(51) Int. Cl.
*B60W 30/18* (2012.01)
*B60W 60/00* (2020.01)
*G08G 1/01* (2006.01)

(52) U.S. Cl.
CPC .. *B60W 30/18163* (2013.01); *B60W 60/0015* (2020.02); *B60W 60/00276* (2020.02); *G08G 1/0116* (2013.01); *B60W 2555/60* (2020.02); *B60W 2556/45* (2020.02)

(58) Field of Classification Search
CPC ............. G08G 1/083; G08G 1/096725; G08G 1/096775; G08G 1/08; B60W 60/0015; B60W 60/00276; B60W 30/18159; B60W 30/09; B60W 30/18163; B60W 2556/45; B60W 2555/60; G05D 1/00; G06F 17/11
See application file for complete search history.

(56) References Cited

U.S. PATENT DOCUMENTS

| | | | | |
|---|---|---|---|---|
| 10,235,882 | B1* | 3/2019 | Aoude | G08G 1/164 |
| 11,145,197 | B2* | 10/2021 | Guo | G08G 1/096775 |
| 11,443,631 | B2* | 9/2022 | Manohar | G08G 1/096758 |
| 11,782,451 | B1* | 10/2023 | Venkatraman | G05D 1/0221 |
| | | | | 701/26 |
| 12,037,024 | B1* | 7/2024 | Denny | B60W 60/0011 |
| 2011/0282565 | A1* | 11/2011 | Law | G08G 5/51 |
| | | | | 701/117 |
| 2016/0027299 | A1* | 1/2016 | Raamot | G08G 1/08 |
| | | | | 340/917 |
| 2016/0129917 | A1* | 5/2016 | Gariepy | G05D 1/0246 |
| | | | | 701/2 |
| 2017/0089717 | A1* | 3/2017 | White | G08G 1/0112 |
| 2018/0079421 | A1* | 3/2018 | Chen | B60W 30/192 |
| 2018/0211523 | A1* | 7/2018 | Ashida | G08G 1/0141 |
| 2018/0211526 | A1* | 7/2018 | Gallagher | G08G 1/04 |
| 2018/0343176 | A1* | 11/2018 | Hui | H04L 45/123 |
| 2019/0012909 | A1* | 1/2019 | Mintz | G06Q 30/0206 |
| 2019/0049957 | A1* | 2/2019 | Healey | B60W 40/08 |
| 2019/0311616 | A1* | 10/2019 | Jin | G05D 1/0297 |
| 2019/0318620 | A1* | 10/2019 | Yang | G08G 1/0133 |
| 2020/0019894 | A1* | 1/2020 | Jin | G08G 1/0145 |
| 2020/0065443 | A1* | 2/2020 | Liu | G06Q 40/08 |
| 2020/0175860 | A1* | 6/2020 | Jiang | G08G 1/0129 |
| 2020/0202711 | A1* | 6/2020 | Martin | G05D 1/0276 |
| 2020/0234582 | A1* | 7/2020 | Mintz | G08G 1/096811 |
| 2020/0242922 | A1* | 7/2020 | Dulberg | G08G 1/096783 |
| 2020/0293009 | A1* | 9/2020 | Quirynen | G05B 13/041 |
| 2020/0294394 | A1* | 9/2020 | Guo | G08G 1/096783 |
| 2020/0388163 | A1* | 12/2020 | Zhang | G08G 1/22 |
| 2021/0001868 | A1* | 1/2021 | Ahn | G06F 17/11 |
| 2021/0097313 | A1* | 4/2021 | Fox | G06T 7/70 |
| 2021/0101602 | A1* | 4/2021 | Qi | G06N 3/049 |
| 2021/0104165 | A1* | 4/2021 | Jacobus | G08G 9/02 |
| 2021/0146959 | A1* | 5/2021 | Manivasagam | G06N 3/044 |
| 2021/0233396 | A1* | 7/2021 | Guo | G08G 1/0133 |
| 2021/0248904 | A1* | 8/2021 | Nguyen | G08G 1/012 |
| 2021/0276594 | A1* | 9/2021 | Oh | H04W 4/44 |
| 2021/0302974 | A1* | 9/2021 | Di Cairano | G06N 5/01 |
| 2022/0080972 | A1* | 3/2022 | Chen | G06V 20/58 |
| 2022/0137961 | A1* | 5/2022 | Quirynen | G06F 9/3836 |
| | | | | 712/210 |
| 2022/0139214 | A1* | 5/2022 | Pittman | H04W 4/80 |
| | | | | 340/907 |
| 2022/0139220 | A1* | 5/2022 | Yu | G08G 1/096775 |
| | | | | 340/909 |
| 2023/0029842 | A1* | 2/2023 | Okano | B60W 30/182 |
| 2023/0050192 | A1* | 2/2023 | Quirynen | G08G 1/0112 |
| 2023/0074148 | A1* | 3/2023 | Di Cairano | G05D 1/104 |
| 2023/0151774 | A1* | 5/2023 | Quirynen | B60W 50/0097 |
| | | | | 701/102 |
| 2024/0013654 | A1* | 1/2024 | Yoon | G08G 1/083 |
| 2024/0017745 | A1* | 1/2024 | Cao | B60W 50/0097 |
| 2024/0104008 | A1* | 3/2024 | Chen | G06F 11/3664 |
| 2024/0308506 | A1* | 9/2024 | Quirynen | B60W 30/14 |
| 2024/0331535 | A1* | 10/2024 | Quirynen | G08G 1/081 |
| 2024/0371264 | A1* | 11/2024 | Budan | G06N 3/04 |

OTHER PUBLICATIONS

Ravikumar, Shreejith, et al. "Mixed-integer programming for centralized coordination of connected and automated vehicles in dynamic environment." 2021 IEEE Conference on Control Technology and Applications (CCTA). IEEE, 2021. (Year: 2021).*

Fayazi, Seyed Alireza, and Ardalan Vahidi. "Mixed-integer linear programming for optimal scheduling of autonomous vehicle intersection crossing." IEEE Transactions on Intelligent Vehicles 3.3 (2018): 287-299. (Year: 2018).*

Hespanhol, Pedro, Rien Quirynen, and Stefano Di Cairano. "A structure exploiting branch-and-bound algorithm for mixed-integer model predictive control." 2019 18th European Control Conference (ECC). IEEE, 2019. (Year: 2019).*

Chen, Yihe, et al. "Mixed integer programming of joint optimization of signal timing and phasing and vehicle trajectories under mixed traffic environment." 2024 IEEE Intelligent Vehicles Symposium (IV). IEEE, 2024. (Year: 2024).*

Pourmehrab, Mahmoud, Lily Elefteriadou, and Sanjay Ranka. "Realtime Intersection Optimization for Signal Phasing, Timing, and Automated Vehicles' Trajectories." arXiv preprint arXiv:2007.03763 (2020). (Year: 2020).*

Gholamhosseinian, Ashkan, and Jochen Seitz. "A comprehensive survey on cooperative intersection management for heterogeneous connected vehicles." IEEE Access 10 (2022): 7937-7972. (Year: 2022).*

Xu, Biao, et al. "Cooperative method of traffic signal optimization and speed control of connected vehicles at isolated intersections." IEEE Transactions on Intelligent Transportation Systems 20.4 (2018): 1390-1403. (Year: 2018).*

Li, Wan, and Xuegang Ban. "Connected vehicles based traffic signal timing optimization." IEEE Transactions on Intelligent Transportation Systems 20.12 (2018): 4354-4366. (Year: 2018).*

Sahin, Yunus Emre, Rien Quirynen, and Stefano Di Cairano. "Autonomous vehicle decision-making and monitoring based on signal temporal logic and mixed-integer programming." 2020 American Control Conference (ACC). IEEE, 2020. (Year: 2020).*

Kim, YoungWoo, et al. "Traffic network control based on hybrid dynamical system modeling and mixed integer nonlinear programming with convexity analysis." IEEE Transactions on Systems, Man, and Cybernetics-Part A: Systems and Humans 38.2 (2008): 346-357. (Year: 2008).*

Chen, Chaoyi, et al. "Mixed platoon control of automated and human-driven vehicles at a signalized intersection: dynamical analysis and optimal control." Transportation research part C: emerging technologies 127 (2021): 103138. (Year: 2021).*

Guilliard, Iain, et al. "A non-homogeneous time mixed integer lp formulation for traffic signal control." 95th Annual Meeting of the Transportation Research Board, Washington, DC. 2016. (Year: 2016).*

* cited by examiner

SYSTEM AND METHOD FOR JOINTLY CONTROLLING CONNECTED AUTONOMOUS VEHICLES (CAVs) AND MANUAL CONNECTED VEHICLES (MCVs)

TECHNICAL FIELD

The present disclosure relates generally to traffic control systems, and more specifically to a system and a method for jointly controlling connected autonomous vehicles (CAVs) and manual connected vehicles (MCVs).

BACKGROUND

Automated transportation systems, even in a case of partial automation, lead to reduced road accidents and efficient usage of a transportation network. Therefore, connected autonomous vehicles (CAVs) are highly likely to contribute for improving safety and traffic flow, and as a consequence for reducing congestion, travel time, emissions and energy consumption. While on-road scenarios are highly dynamic, i.e., vehicle participants and their behavior changes rapidly and significantly, vehicle-to-vehicle (V2V) and vehicle-to-infrastructure (V2I) communication, enables advanced and efficient planning and decision making by providing access to real-time information on all vehicles in the transportation network.

Some approaches use a multi-layer guidance and control architecture implemented on-board for motion planning and control of the CAVs. For example, at the highest level, a navigation system determines a route plan through the transportation network from a current position to a desired position of the CAV. Further, a decision system determines a target driving behavior at any point of time, based on the route plan, a current environment condition, and behavior of other traffic participants. Further, based on the target driving behavior, including lane following, lane changing or stopping, a motion planning algorithm computes a dynamically feasible and safe trajectory that can be tracked in real-time by a controller such as a model predictive control (MPC).

Additionally, coordination of the CAVs allows to achieve an optimal behavior for the transportation network. One example describes a first come, first serve (FCFS) policy for autonomous traffic management at intersections. Another example includes coordination strategies for the intersections, using nonlinear optimization or using mixed-integer linear programming (MILP).

However, it is possible to encounter scenarios of a mixed traffic, where CAVs coexist with Manual Connected Vehicles (MCVs) that are controlled by human drivers. In such scenarios, achieving the optimal behavior for the transportation network is challenging as the MCVs are not subject to the motion control as the CAVs. In some approaches, the CAVs are used to control motion of the MCVs by occupying the lanes in specific ways. This however may become dangerous and negatively affect the CAVs, their operations, and their passengers. In normal scenarios, the motion/flow of the MCVs is regulated by traffic rules. Some traffic rules are dynamic, for example, traffic lights, lanes with speed limits, and the like, that can be varied in real-time and displayed on appropriate panels. The motion of the MCVs can be controlled by setting the dynamic traffic signs. However, the dynamic traffic signs are set based on general road conditions, often by human operator, without considering goals of each vehicle.

Thus, there is a need for a system and a method for optimal and joint controlling of the motion of CAVs and MCVs to optimally achieve the goals of CAVs and MCVs in the transportation network.

SUMMARY

It is an object of some embodiments to provide a system and a method for jointly controlling connected autonomous vehicles (CAVs) and manual connected vehicles (MCVs). As used herein, the CAVs refers to autonomous vehicles, and the MCVs refers to manually operated vehicles. According to an embodiment, the CAVs can be controlled continuously at any point in time and space, to achieve optimization of the transportation network, such as minimizing an average or worst-case travel time, an overall idling time, and the like. In contrast, the MCVs are non-controlled vehicles. In other words, it is impossible or at least impractical to control motion of the MCVs at each point in time and space. In different traffic scenarios with only MCVs, the motion of the MCVs is controlled through traffic signs. For example, a flow of the MCVs is affected by timing and sequencing of the traffic lights so that an overall operation of the transportation network is positively affected. As such, the motion of the MCVs are controlled indirectly by controlling the traffic signs. However, since the MCVs are driven by human drivers and are controlled indirectly based on the traffic signs, the control of the MCVs is possible only at specific locations, which yields limited control over the transportation network.

Some embodiments are based on the recognition that it can be beneficial to jointly control the CAVs and the MCVs to optimize overall benefits for the CAVs and the MCVs such as minimizing the average or worst-case travel time, an overall idling time, and the like. The joint control of the CAVs and MCVs is problematic based in part on the following reasons. For example, in order to control the CAVs directly at each point of time and space, each CAV is controlled individually based on its motion model and a model of the environment. In contrast, to control the MCV indirectly by changing states of the traffic signs, various techniques use different statistical properties such as traffic density to control the MCVs together as an aggregation of the traffic. Such statistical aggregation is valid for the indirect control of the MCVs to optimize the transportation network, but it precludes joint optimization of the CAVs and the MCVs to achieve a set of individual objectives of those specific individual vehicles and a common objective for that specific group of individual vehicles. This is because individual and statistical operations have different principles precluding the joint optimization, specifically, statistical optimization optimizes average behaviors to achieve desired properties of a road, e.g., average speed, average density of vehicles, etc., while individual optimization optimizes behavior of each single unit in achieving that unit specific goal. In other words, the statistical optimization of the traffic only depends on a number, position and velocity of vehicles on the road, but does not account for goals of each vehicle. The individual optimization accounts for such goals and the individual optimization of a group of vehicles optimizes the individual goals for all vehicles in the group. Individual optimization can also optimize common goals for a specific group of vehicles.

According to an embodiment, motion of a CAV can be described by a motion model described by one or multiple differential or difference equations relating a control command with a state of the CAV while satisfying general traffic rules. The general traffic rules, for example, include rules of crossing intersections, avoiding collision with neighbor vehicles, occupying an open lane, satisfying lane speed limits, and the like. Hence, based on the state of the CAV and a desired control objective, it is possible to optimize control commands achieving the control objective constrained by the general traffic rules. The state of the CAV includes at least one of a position, a velocity, an acceleration, and a lane of the CAV.

In contrast, motion of a MVC depends on the states of the traffic signs and response of human driver of the MCV to such states. Hence, joint optimization of the CAV and the MVC is a multi-objective optimization over decision variables including control commands to the CAV that change the state of the CAV, and control commands that change the states of the traffic signs. However, such a joint optimization is challenging.

Some embodiments are based on the realization that in order to provide the joint control of the CAV and the MCV, there is a need to describe individual motion models of the CAV and the MCV. Specifically, while the motion model of the CAV can be described as a function of control commands being optimized, there is a need to describe a motion model of the MCV as a function of a state of the traffic signs. However, determining such a function is challenging because different human drivers can react differently to different states of the traffic signs such as the traffic light. For example, depending on situation, the human drivers can accelerate, decelerate or stop their vehicle when the traffic light is changing its state from green light to yellow.

Some embodiments are based on the realization that the motion model of the MCV can be described with multiple functions where each of them is active at different times. Different functions for different dynamic traffic rules are formulated. Examples of the dynamic traffic rules include the traffic signs such as traffic lights, which can receive control commands to change their timing to let more or fewer vehicle pass through in a certain direction, variable speed limits, that can received control commands to change the maximum speed of vehicles in certain lanes, and dynamically enabled lanes, which can receive control commands to open or block access to the lane, and the like.

Each function represents a motion model for the corresponding dynamic traffic rule. In other words, each function describes behavior of the MCV in response to the corresponding dynamic traffic rule. The motion models represented by the functions are referred to as rule-restricted motion models. In addition, a rule-free function representing a rule-free motion model is formulated. The rule-free motion model is unaffected by the dynamic traffic rules. Selection of a function to be active for the MCV depends on the states of the traffic signs, a state of the MCV, and other vehicles' states. The state of the MCV includes at least one of a position, a velocity, an acceleration, and a lane of the MCV.

Hence, while the functions themselves may not be dependent on the states of the traffic signs, however, the selection of the function to be active at a particular control step depends on the states of the traffic signs. Collectively, the functions are referred to herein as a switch (discontinuous) function that selects a function representing the motion model for the MCV, based one or a combination of the states of the traffic signs, the state of the MCV, and the other vehicles' states.

While the switch function describes the individual motion of MCV, because of its discontinuous nature, the joint multivariable optimization of control commands to the CAV and control commands to the traffic signs are represented by a mixed-integer optimization problem that must be solved to jointly optimize CAVs and MCVs achieving their individual goals and the common goal of their group.

Accordingly, one embodiment discloses a traffic control system for jointly controlling one or multiple connected autonomous vehicles (CAVs) and one or multiple manual connected vehicles (MCVs) moving to form traffic on the same or intersecting roads. The traffic control system comprises at least one processor; and a memory having instructions stored thereon that, when executed by the at least one processor, cause the traffic control system to collect digital representation of states of each of the CAVs, each of the MCVs, and each of traffic signs regulating the traffic; solve a multi-variable mixed-integer problem (MIP) optimizing over a finite future prediction time interval a cost function for values of control commands changing states of each of the CAVs and values of control commands changing states of each of the traffic signs, wherein the cost function of individual goals of each CAV and MCV and a common goal for individual group of the CAVs and the MCVs is optimized subject to a motion model of each of the CAVs described by a differential equation relating a control command to a CAV with a change of a state of the CAV, subject to constraints modeling general traffic rules, subject to timing constraints, and subject to a motion model of each of the MCVs described by a switch function relating a dynamic traffic rule for an MCV with a state of the MCV and a state of each of the traffic signs; and transmit the optimized values of the control commands to the corresponding CAVs and corresponding traffic signs.

Accordingly, another embodiment discloses a method for jointly controlling one or multiple connected autonomous vehicles (CAVs) and one or multiple manual connected vehicles (MCVs) moving to form traffic on the same or intersecting roads. The method comprises collecting digital representation of states of each of the CAVs, each of the MCVs, and each of traffic signs regulating the traffic; solving a multi-variable mixed-integer problem (MIP) optimizing over a finite future prediction time interval a cost function for values of control commands changing states of each of the CAVs and values of control commands changing states of each of the traffic signs, wherein the cost function of individual goals of each CAV and MCV and a common goal for individual group of the CAVs and the MCVs is optimized subject to a motion model of each of the CAVs described by a differential equation relating a control command to a CAV with a change of a state of the CAV, subject to constraints modeling general traffic rules, subject to timing constraints, and subject to a motion model of each of the MCVs described by a switch function relating a dynamic traffic rule for an MCV with a state of the MCV and a state of each of the traffic signs; and transmitting the optimized values of the control commands to the corresponding CAVs and corresponding traffic signs.

Accordingly, yet another embodiment discloses a non-transitory computer-readable storage medium embodied thereon a program executable by a processor for performing a method for jointly controlling one or multiple connected autonomous vehicles (CAVs) and one or multiple manual connected vehicles (MCVs) moving to form traffic on the same or intersecting roads. The method comprises collecting digital representation of states of each of the CAVs, each of the MCVs, and each of traffic signs regulating the traffic; solving a multi-variable mixed-integer problem (MIP) optimizing over a finite future prediction time interval a cost function for values of control commands changing states of each of the CAVs and values of control commands changing states of each of the traffic signs, wherein the cost function of individual goals of each CAV and MCV and a common goal for individual group of the CAVs and the MCVs is optimized subject to a motion model of each of the CAVs described by a differential equation relating a control command to a CAV with a change of a state of the CAV, subject to constraints modeling general traffic rules, subject to timing constraints, and subject to a motion model of each of the MCVs described by a switch function relating a dynamic traffic rule for an MCV with a state of the MCV and a state of each of the traffic signs; and transmitting the optimized values of the control commands to the corresponding CAVs and corresponding traffic signs.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
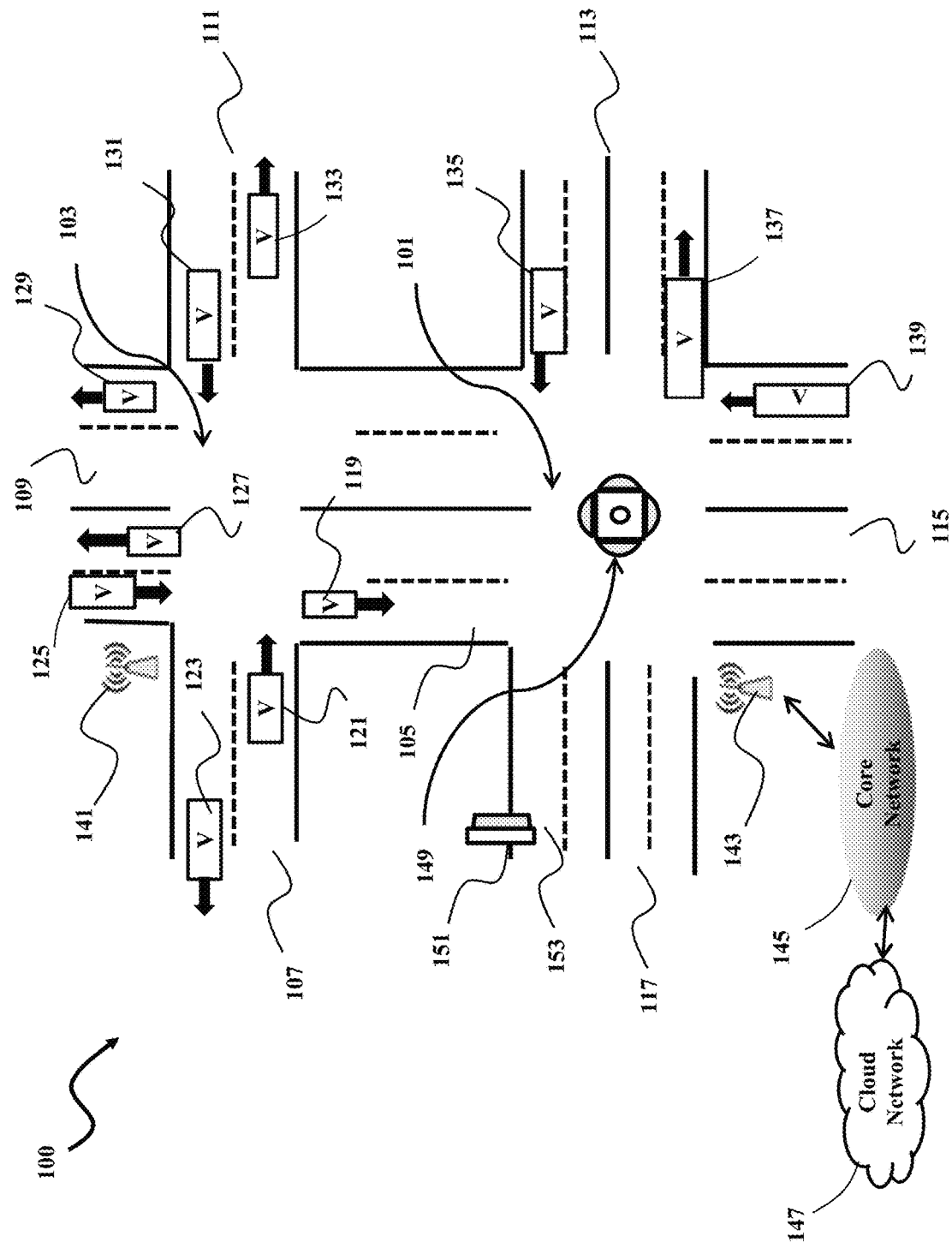
FIG. 1 shows an example of a traffic scenario in a transportation network including interconnected conflict zones, according to some embodiments of the present disclosure.

FIG. 1 shows an example of a traffic scenario 100 in a transportation network including interconnected conflict zones, according to some embodiments of the present disclosure. The interconnected conflict zones include physically interconnected conflict zones and communicably interconnected conflict zones. Examples of the physically interconnected conflict zones are intersections or merging points where vehicles can travel from one conflict zone to another conflict zone. Examples of communicably interconnected conflict zones are intersections or merging points that share traffic information from one conflict zone to another conflict zone via communication channels.

The transportation network includes an intersection 101 and another intersection 103 which are physically interconnected to each other via a road segment 105, and additional road segments 107, 109, 111, 113, 115 and 117. Examples of the interconnected conflict zones are the intersections 101-103 and/or merging points, which may connect multiple lanes and/or road segments. Examples of conflict-free zones are the road segments 105-117, including one or multiple lanes that allow either a single direction or multiple directions of traffic.

The traffic scenario 100 includes multiple vehicles 119, 121, 123, 125, 127, 129, 131, 133, 135, 137, 139 and/or other traffic participants within a local area of the intersections 101-103 and the road segments 105-117. The vehicles in the traffic, e.g., vehicles 119-139, may each be either an autonomous, semi-autonomous or manually operated vehicle. The autonomous and/or semi-autonomous vehicles are referred to as connected autonomous vehicles (CAVs), or simply as controlled vehicles, and manually operated vehicles or other traffic participants are referred to as manual connected vehicles (MCVs). Some examples of the vehicles 119-139 include two-wheeler vehicles, such as motor bikes, four-wheeler vehicles, such as cars, or more than four-wheel vehicles, such as trucks and the like.

According to some embodiments, the vehicles 119-139 follow general traffic rules. The general traffic rules, for example, include rules of crossing intersections, avoiding collision with neighbor vehicles, occupying an open lane, satisfying lane speed limits, and the like. Additionally, the general traffic rules include dynamic traffic rules that dynamically change upon receiving corresponding control commands. Examples of the dynamic traffic rules include traffic signs such as traffic lights, which can receive control commands to change their timing to let more or fewer vehicle pass through in a certain direction, variable speed limits, that can received control commands to change the maximum speed of vehicles in certain lanes, and dynamically enabled lanes, which can receive control commands to open or block access to the lane, and the like. The dynamic traffic rules may be displayed on digital displays on the road segments to inform the vehicles 119-139 of state of the dynamic traffic rules. For example, a traffic light display 149 may be configured to display a state of the traffic light for the intersection 101, a lane speed display configured to display a lane speed limit, and a lane access status display 151 configured to display a status indicating whether access to a lane 153 is enabled or disabled.

In some embodiments, the traffic scenario 100 corresponds to a public metropolitan area, where the road segments 105-117 form a (large) number of intersections, such as the intersections 101 and 103. In the public metropolitan area, traffic conditions at the intersections 101 and 103 determine traffic flow because traffic congestion usually starts at a conflict zone, such as the intersection 103, and it propagates further to the conflict-free road segments, e.g., the road segments 105-117. The traffic conditions at the intersections 101 and 103 are interdependent such that a variation at one conflict zone, e.g., the intersection 103, propagates further to other interconnected conflict zones, such as the intersection 101 (which is also called a neighboring intersection 101 for the intersection 103).

In other embodiments, the traffic scenario 100 corresponds to a private transportation network, e.g., including one or multiple parking areas and interconnected road segments for a valet parking system. Other examples of similar traffic scenarios, including a transportation network with multiple interconnected conflict zones and road segments, are large factories, network of warehouses, smart distribution centers and/or shipping yards. Examples of types of CAVs include personal vehicles (e.g., in case of the valet parking system), trucks (e.g., in case of a yard management system) or shuttles for pick-up and drop-off of passengers.

In some implementations, the transportation network includes one or multiple road-side units (RSUs) for infrastructure-based real-time sensing of states of the vehicles 119-139 and other traffic participants in a local area around each of the RSUs. For example, the transportation network includes one RSU 141 and another RSU 143, a core network 145, and a cloud network 147 to establish an Internet of Vehicles (IoV) environment, including vehicle-to-vehicle (V2V) and vehicle-to-infrastructure (V2I) communication, also known as vehicle-to-everything (V2X) communication. Some embodiments are based on the recognition that, to establish communication among different vehicles (e.g., the vehicles 119-139) in the transportation network, communication between the cloud network 147 and the vehicle 119 on the road segment 105 needs to propagate through the RSU 141 or the RSU 143 and the core network 145 in such a way that a multi-hop communication is established.

Embodiments of the present disclosure are based on the recognition that on-board control devices of the vehicles, such as the vehicle 139, cannot obtain information about neighboring vehicles (such as the vehicle 135), pedestrians and environment conditions that are out of their visible range. For instance, the vehicle 139 traveling on the road segment 115 intends to cross the intersection 101 after the vehicle 37 (that is bigger in size than the vehicle 135) crosses the intersection 101, and the vehicle 135 (that is a small sized vehicle) is also moving into the intersection 101. In such a scenario, visibility of the vehicle 135 is blocked by the vehicle 137 as shown in FIG. 1. The vehicle 137 prevents the vehicle 135 from getting noticed by the vehicle 139 if communication link between the vehicle 135 and the vehicle 139 is affected or if vehicle 135 and vehicle 139 use different communication protocols. As a result, the vehicle 135 and the vehicle 139 might collide. In addition, some embodiments of the present disclosure are based on the recognition that the multi-hop communication between the cloud network 147 and the vehicle 119 can result in a long communication delay, which may not be acceptable in real-time scenarios of cloud-based vehicle control.

To that end, in some embodiments, different communication technologies are utilized to support vehicular communications. For example, IEEE Dedicated Short-Range Communications/Wireless Access in Vehicular Environments (DSRC/WAVE) standard family for vehicular networks, 3GPP Cellular-Vehicle-to-Anything (C-V2X), and the like. However, due to high cost reasons, it is impractical for the vehicles 119-139 to support more than one short-range communication technology, which leads to compatibility issues among the vehicles 119-139 to communicate with each other. Therefore, vehicles equipped with the IEEE DSRC/WAVE cannot communicate with other vehicles equipped with the 3GPP C-V2X, and vice versa. Consequently, accuracy of real-time control decisions by an on-board, multi-layer guidance and control architecture in each individual vehicle may be affected because these real-time decisions may be based on incomplete information of the traffic scenario 100.

According to some embodiments, edge infrastructure devices (e.g., the RSU 141 and the RSU 143) have advantages for controlling the traffic over usage of only the cloud network 147 and/or only the on-board control devices (including the multi-layer guidance and control architecture). For example, the edge infrastructure devices can be installed at the intersections 101 and 103, and they may directly communicate with vehicles approaching the intersections 101 and 103. In addition, the edge infrastructure devices can be equipped with multiple communication technologies in order to be able to communicate with all the vehicles 119-139. The edge infrastructure devices are stationary, which enable them in providing reliable communication with the vehicles 119-139 as well as in collecting high-quality environmental data.

Additionally, the edge infrastructure devices may be configured to continuously monitor the traffic and the environment conditions. In some embodiments of the present disclosure, the edge infrastructure devices use additional sensors, e.g., distance range finders, radars, lidars, and/or cameras, as well as sensor fusion technologies in order to accurately detect the states of the vehicles 119-139 and other traffic participants such as bicycles and the pedestrians.

According to an embodiment, the CAVs can be controlled continuously at any point in time and space from the edge infrastructure devices, to achieve optimization of the transportation network, such as minimizing an average or worst-case travel time, an overall idling time, and the like. In contrast, the MCVs are non-controlled vehicles. In other words, it is impossible or at least impractical to control motion of the MCVs at each point in time and space. In different traffic scenarios with only MCVs, the motion of the MCVs is controlled through the traffic signs. For example, a flow of the MCVs is affected by timing and sequencing of the traffic lights so that an overall operation of the transportation network is positively affected. As such, the motion of the MCVs are controlled indirectly by controlling the traffic signs. However, since the MCVs are driven by human drivers and are controlled indirectly based on the traffic signs, the control of the MCVs is possible only at specific locations, which yields limited control over the transportation network.

Some embodiments are based on the recognition that it can be beneficial to jointly control the CAVs and the MCVs to optimize overall benefits for the CAVs and the MCVs such as minimizing the average or worst-case travel time, the overall idling time, and the like. To that end, it is an object of some embodiments to provide a traffic control system for jointly controlling the CAVs and MCVs. In some embodiments, the traffic control system is implemented using one or multiple mobile edge computers (MECs), which can be either embedded as part of one or multiple RSUs or they can be separate devices that are connected to the RSUs 122-124, the cloud network 118 and/or core network 120.

Figure 2:
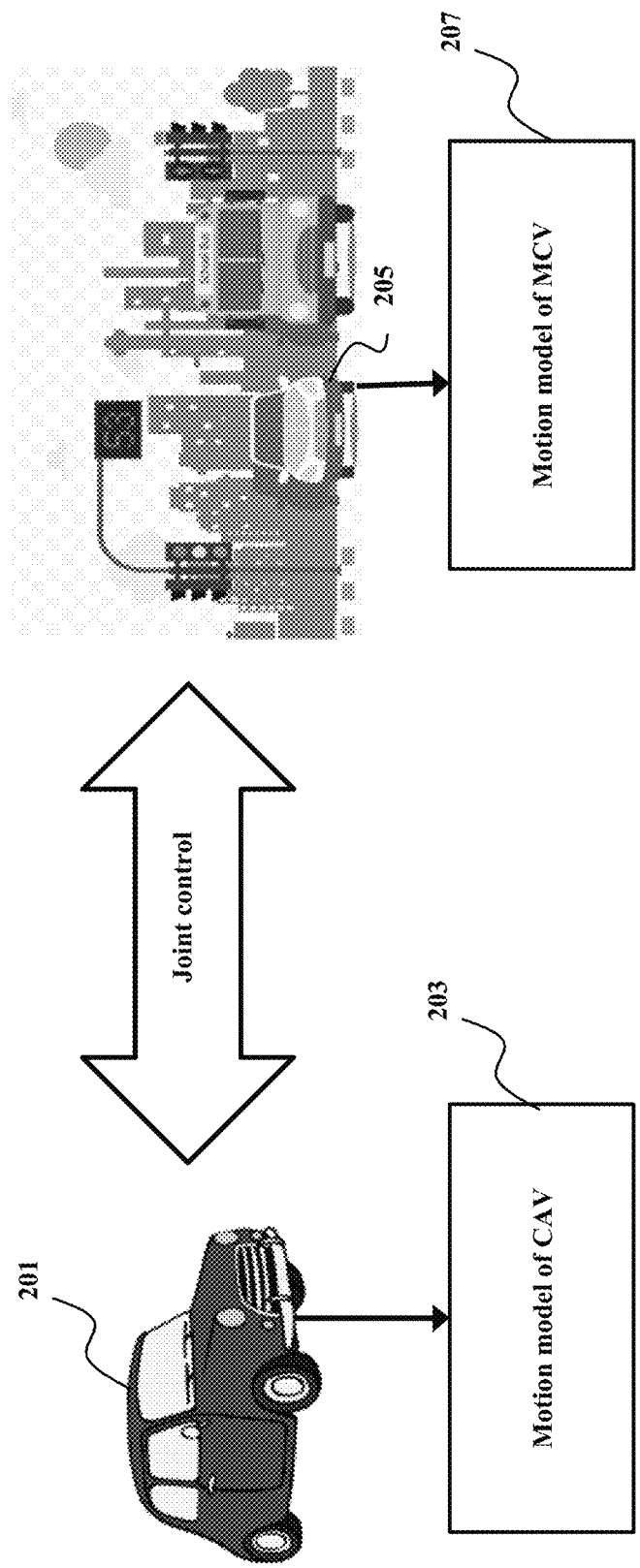
FIG. 2 shows a schematic of principles used for jointly controlling connected autonomous vehicles and manual connected vehicles, according to an embodiment of the present disclosure.

FIG. 2 shows a schematic of principles used for jointly controlling the CAVs and MCVs, according to an embodiment of the present disclosure. The joint control of the CAVs and MCVs is problematic based in part on the following reasons. For example, in order to control the CAVs directly at each point of time and space, each CAV is controlled individually based on its motion model and a model of the environment. In contrast, to control the MCV indirectly by changing states of the traffic signs, various techniques use different statistical properties such as traffic density to control the MCVs together as an aggregation of the traffic. Such statistical aggregation is valid for the indirect control of the MCVs to optimize the transportation network, but it precludes joint optimization of the CAVs and the MCVs to achieve individual objectives of those specific individual vehicles and a common objective for that specific group of individual vehicles. This is because individual and statistical operations have different principles precluding the joint optimization, specifically, statistical optimization optimizes average behaviors to achieve desired properties of a road, e.g., average speed, average density of vehicles, etc., while individual optimization optimizes behavior of each single unit in achieving that unit specific goal. In other words, the statistical optimization of the traffic only depends on a number, position and velocity of vehicles on the road, but does not account for goals of each vehicle. The individual optimization accounts for such goals and the individual optimization of a group of vehicles optimizes the individual goals for all vehicles in the group.

According to an embodiment, motion of a CAV 201 can be described by a motion model 203 described by one or multiple differential equations relating a control command with a state of the CAV 201 while satisfying the general traffic rules. Hence, based on the state of the CAV 201 and a desired control objective, it is possible to optimize control commands achieving the control objective constrained by the general traffic rules. The state of the CAV 201 includes at least one of a position, a velocity, an acceleration, and a lane of the CAV 201.

In contrast, motion of an MVC 205 depends on the states of the traffic signs and response of human driver of the MCV 205 to such states. Hence, joint optimization of the CAV 201 and the MVC 205 is a multi-objective optimization over decision variables including control commands to the CAV 201 that change the state of the CAV 201, and control commands that change the states of the traffic signs. However, such a joint optimization is challenging.

Some embodiments are based on the realization that in order to provide the joint control of the CAV 201 and the MCV 205, there is a need to describe individual motion models of the CAV 201 and the MCV 205.

Specifically, while the motion model 203 of the CAV 201 can be described as a function of control commands being optimized, there is a need to describe a motion model 207 of the MCV 205 as a function of a state of the traffic signs. However, determining such a function is challenging because different human drivers can react differently to different states of the traffic signs such as the traffic light. For example, depending on situation, the human drivers can accelerate, decelerate or stop their vehicle when the traffic light is changing its state from green light to red.

Figure 3:
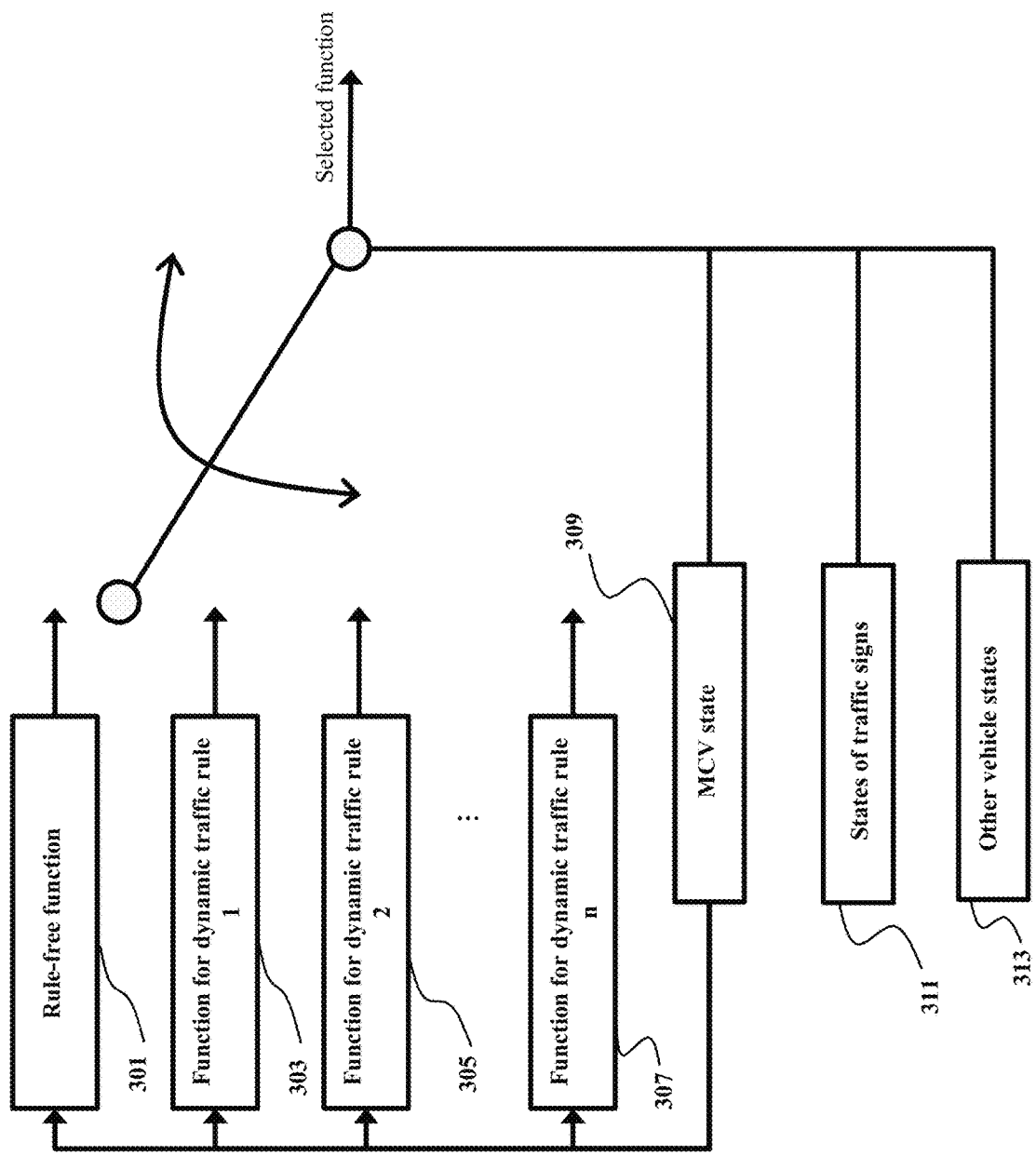
FIG. 3 shows a schematic for a motion model of a manual connected vehicle, according to an embodiment of the present disclosure.

Some embodiments are based on the realization that the motion model 207 of the MCV 205 can be described with multiple functions each of them or different combinations of them are active at different times, as explained in FIG. 3.

FIG. 3 shows a schematic for the motion model 207 of the MCV 205, according to an embodiment of the present disclosure. Different functions for different dynamic traffic rules are formulated. For example, a function 303 for dynamic traffic rule1, a function 305 for dynamic traffic rule2, a function 307 for dynamic traffic rule n, are formulated. Each of the functions 303-307 represents a motion model for the corresponding dynamic traffic rule. In other words, each function describes behavior of the MCV 205 in response to the corresponding dynamic traffic rule. The motion models represented by the functions 303-307 are referred to as rule-restricted motion models. In addition, a rule-free function 301 representing a rule-free motion model is formulated. The rule-free motion model is unaffected by the dynamic traffic rules.

Selection of a function to be active for the MCV 205 depends on states 311 of the traffic signs, a state 309 of the MCV 205, and other vehicles' states 313. The state 309 of the MCV 205 includes at least one of a position, a velocity, an acceleration, and a lane of the MCV 205. Hence, while the functions 301-307 themselves may not be dependent on the states 311 of the traffic signs, however, the selection of the function to be active at a particular control step depends on the states 311 of the traffic signs. Collectively, the functions 301-307 are referred to herein as a switch (discontinuous) function that selects a function representing the motion model for the MCV 205, based one or a combination of the states 311 of the traffic signs, the state 309 of the MCV 205, and the other vehicles' states 313. The functions 301-307 individually describe dynamic traffic rules that the MCVs should follow.

According to an embodiment, the selected function can be used as the motion model of the MCV 205 for the joint optimization of the CAV 201 and the MVC 205. In particular, the traffic control system solves a multi-variable mixed-integer problem (MIP) optimizing a cost function for values of the control commands changing states of each of the CAVs and values of the control commands changing states of each of the traffic signs. The cost function is optimized subject to the motion model of each of the CAVs and the motion model of each of the MCVs.

According to an embodiment, the motion model 203 of the CAV 201 may represented as a dynamical system $$x_i(t+1)=f(x_i(t),u_i(t))$$

$$p_i(t)=h_p(x_i(t),u_i(t))$$

$$\lambda_i(t+1)=h_\lambda(x_i(t),u_i(t))$$

$$i. \tag{1}$$

where t is an index of a time instant in a discrete-time sequence of sampling instants, equispaced with sampling period $T_s$, $x_i$ is CAV state vector, $u_i$ is a control vector (also referred to as control command) determined by the traffic control system, f is a state update function, which is normally a continuous function determining an evolution of system state $x_i$ over time, $h_p$ and $h_\lambda$ are output functions that provide a current position of the CAV 201 along its route (route-relative position) and a current lane of the CAV 201.

The CAV 201 is also subject to constraints which represents limitations on the velocity, acceleration, and possibly control commands, $$x_i \in \mathcal{X}_i, u_i \in \mathcal{U}_i \tag{2}$$

where $\mathcal{X}_i$, $\mathcal{U}_i$ are admissible state and input regions, respectively.

In some embodiments, constraints that model the general traffic rules are formulated. For example, an exemplary model is described for the traffic lights. Other traffic rules can be modelled similarly with modifications due according to their functions. A traffic light in conflict zone $j \in \mathcal{J}^x$ where $\mathcal{J}^x$ is a set of all conflict zones, is represented by a number of variables $\psi_j^d$ with logic values where true (or 1) indicates passing the conflict zone j in direction d is allowed, while false (or 0) indicates that passing the conflict zone j in direction d is not allowed where $d \in \mathcal{D}(j)$ indexes directions $\mathcal{D}(j)$ in the conflict zone j. Thus, the fact that only one direction is allowed to cross the intersection (e.g., the intersection 101/103) at the same time is represented by a logic constraint $$\underline{\vee}_{d \in \mathcal{D}(j)} \psi_j^d, \forall j \in \mathcal{J}^x \tag{3}$$

where $\underline{\vee}$ is an exclusive or (xor) operator, and hence 1 and only 1 direction is allowed to pass through the intersection at any time. In certain embodiments of the constraint (3) is modified to allow group of directions to cross the intersection at the same time as long as that does not cause the vehicles to possibly collide, i.e., directions in the intersection do not cross.

Further, in an embodiment, the optimization of the cost function is subject to timing constraints. The timing constraints include at least one of a timer enabling or disabling a change of the traffic signs and a timer enabling or disabling a change of CAV driving lane. For example, timers $\mathcal{T}_{\psi_j^d}$ associated with the traffic lights are used to restrict the generate control commands for the traffic lights such that a minimum and maximum time for changing lights in the traffic light is satisfied, $$\mathcal{T}_{\psi_j^d}(t) \leq \mathcal{T}_{\psi_j^d}^{min} \Rightarrow \psi_j^d(t+1) = \psi_j^d(t)$$

$$\mathcal{T}_{\psi_j^d}(t) \leq \mathcal{T}_{\psi_j^d}^{max} \Rightarrow \psi_j^d(t+1) \neq \psi_j^d(t) \tag{4}$$

The traffic control system may update a timer $\mathcal{T}_v$ monitoring a change of variable $\mathcal{V}$ by evaluating $$\mathcal{T}_v(t+1) = \begin{cases} \mathcal{T}_v(t) + T_s & \text{if } v(t+1) = v(t) \\ 0 & \text{if } v(t+1) \neq v(t) \end{cases} \tag{5}$$

and $$\mathcal{H}(v(t+1), v(t), \mathcal{T}_v(t)) \leq 0,$$

models the constraints on when value of $\mathcal{V}$ can change, based on timer value $\mathcal{T}_v$.

The traffic control system ensures that the CAVs are assigned to available lanes by computing control commands that satisfy constraint $$p_i \in \mathcal{Z}_j^d(i) \Rightarrow \lambda_i \in \mathcal{S}_\lambda^d(j), \tag{6}$$

where $\mathcal{Z}_j^d(i)$ is a set of positions of the i-th vehicle (CAV or MCV) along its route for which it is in j-th zone, either conflict or conflict-free, in d-th direction, and $\mathcal{S}_\lambda^d(j)$ is a set of lanes available in the j-th zone in the d-th direction. Additionally, constraints on minimum time between two lane changes may be imposed using a time for lane change of i-th CAV, $$\mathcal{T}_{\lambda_i}(t) \leq \mathcal{T}_{\lambda_i}^{min} \Rightarrow \lambda_i(t+1) = \lambda_i(t) \tag{7}$$

where $\mathcal{T}_{\lambda_i}$ is a timer on lane change of i-th CAV that the traffic control system defines similarly to (5). The traffic control system controls operation of vehicles (both CAVs and MCVs) in the intersection (e.g., the intersection 101/103) by generating control commands that satisfy constraints $$p_i \in \mathcal{Z}_j^d(i) \Rightarrow p_{\bar{i}} \not\in \mathcal{Z}_j^{\bar{d}}(\bar{i}), \forall i \neq \bar{i}, d \neq \bar{d} \neg \psi_j^d \Rightarrow p_i \not\in \mathcal{Z}_j^d(i), \tag{8}$$

which ensure that if i-th vehicle is in the intersection in the d-th direction, then a different vehicle cannot be in the same intersection with a different direction, and that if the traffic light does not allow a direction to pass, no vehicle is in the intersection going through that direction. The traffic control system may also group directions into compatible directions that are allowed to pass through the intersection at the same time, as long as they do not cause collisions.

When value of $\psi_j^d$ can be changed by control commands for jointly controlling the CAVs and MCVs, the intersection rule (8) is a dynamic traffic rule in the sense that since for fixed vehicle positions, the satisfaction or violation of the traffic rule will not always be the same, since it depends on an actual value of $\psi_j^d$, decided by the traffic control system.

Additionally, the traffic control system generates control commands for the CAVs, which avoid rear end collisions, by imposing the constraints $$p_i(t) \in \mathcal{Z}_j^d(i), p_{\bar{i}}(t) \in \mathcal{Z}_j^d(\bar{i}), z_j^i(p_i(t)) \leq z_j^{\bar{i}}(p_{\bar{i}}(t)) \leq z_j^{\bar{i}}(p_{\bar{i}}(t)) \Rightarrow z_j^i(p_i(t+1)) \leq z_j^{\bar{i}}(p_{\bar{i}}(t+1)) \vee \lambda_i(t+1) \neq \lambda_{\bar{i}}(t+1), \tag{9}$$

which ensure that if i-th vehicle is behind another vehicle in the same j-th zone going in the same d-th direction at a certain time instant t, then it will be behind the same vehicle at the next time instant t+1, or they will be in a different lane, where function $z_j^i(p_i)$ provides a position of i-th vehicle in the j-th zone in global coordinates for route-relative vehicle position $p_i$.

The collision avoidance rule (9) on the position of the vehicle, is independent from other variables controlled from the traffic control system, other than the position of the vehicles themselves, and hence it is not a dynamic traffic rule, since for fixed vehicle positions, the satisfaction of violation of the traffic rule will always be the same.

In an embodiment, the motion model for the MCV (e.g., MCV 205) may be described as a switched dynamical system of form $$x_i(t+1) = \begin{cases} g_\xi(x_i(t)) & \text{if } \mathcal{G}_\xi(X(t), \psi(t)) \leq 0 \\ g_0(x_i(t)) & \text{otherwise} \end{cases} \tag{10}$$

$$p_i(t) = h_p(x_i(t))$$

$$p_i(t) = h_\lambda(x_i(t)),$$

$X = \{x_i\} i \in \mathcal{I}$ is a set of all vehicle states, $\psi = \{\psi_j^d\} j \in \mathcal{J}$, $d \in \mathcal{D}(j)$ is a set of all controlled direction traffic lights, g0 is a function describing the rule-free motion model, and $g_\xi, \xi \in \Xi$ are functions representing the motion models in presence of the traffic rules. The traffic rule activates the motion model $g_\xi$, $\xi \in \Xi$, when the function $\mathcal{G}_\xi$, $\xi \in \Xi$ is non-positive and $$\mathcal{G}_{\xi_1}(X(t),\psi(t)) \leq 0 \Rightarrow \mathcal{G}_{\xi_2}(X(t),\psi(t)) > 0, \forall \xi_2 \in \Xi, \xi_2 \neq \xi_1$$

i.e., non-positivity of the functions $\mathcal{G}_\xi$, $\xi \in \Xi$ is mutually exclusive.

As a specific example of (10) in the case when stopping at red traffic light is considered, the motion model for the MCV may be given as $$p_i(t+1) = \begin{cases} p_i(t) & \text{if } \begin{cases} \exists\, d \in \mathcal{D}(j),\, p_i \notin \mathcal{Z}_j^d(i), \\ p_i + \overline{\Delta} \in \mathcal{Z}_j^d(i),\, -\psi_j^d \end{cases} \\ p_i(t) + v_i T_s & \text{otherwise} \end{cases} \quad (11)$$

where in case a position of the i-th MCV is not yet in the d-th direction of the j-th conflict zone but it is not more than $\overline{\Delta}$ away from it, and the traffic light does not enable crossing in the d-th direction of the j-th conflict zone, the i-th MCV stops, otherwise, it proceeds with its current speed. In case of the motion model (10) there is only one traffic rule and hence two models: one for when the MCV is affected by such traffic rule, which occurs near the intersection, when the light is red, and another one is the rule-free model that is used otherwise.

Further, to jointly control the CAVs and the MCVs, the traffic control system determines the values of the control commands changing the states of each of the CAVs and the values of the control commands changing the states of each of the traffic signs according to a cost function, to be minimized, which represents the individual objectives and the common objective that the CAVs and MCVs must achieve. In an embodiment, the cost function be formulated as $$J(P_N, \Lambda_N, U_N, \psi_N) = \\ F(P(N|t), \Lambda(N|t), \psi(N|t)) + \sum_{k=0}^{N-1} L(P(k|t), \Lambda(k|t), U(k|t)\psi(k|t)) \quad (12)$$

where $P_N = (P(0|t) \ldots P(N|t))$ is a sequence of predicted positions at time t over the future horizon of N steps of all the vehicles, e.g., the vehicles 119-139, $\Lambda_N = (\Lambda((0|t) \ldots \Lambda((N|t))$ is a sequence of predicted lane occupation at time t over future horizon of N steps by all the vehicles, $U_N = (U(0|t) \ldots U((N|t))$ is a sequence of predicted control commands at time t over the future horizon of N steps for all the CAVs and $\psi_N = (\psi(0|t) \ldots \psi((N|t))$ are the control commands for the traffic signs, F is a terminal cost, L is a stage cost, and notation $a(k|t)$ describes value of a predicted k steps ahead of time t.

The stage and terminal costs may be composed of multiple terms. For instance, a term $$\sum_{i \in I} w_i^p \left(1 - \frac{p_i(k|t)}{p_i^{end}}\right)^l \quad (13a)$$

sums a normalized distance of the vehicles 119-139 to an end of their travel $p_i^{end}$ where $l=1,2$ determines whether that distance is square or not, and $w_i^p \geq 0$ are weights encoding priorities of the vehicles 119-139 and a priority of this term with respect to other terms. (13a) enables controlling of the vehicles 119-139 such that they reach their destination at the earliest, and as such enables optimizing the individual time of completion of the objective of each specific individual vehicle.

Further, a term $$w^m \left(\max_{i \in I}\left(1 - \frac{p_i(k|t)}{p_i^{end}}\right)\right)^l \quad (13b)$$

gives the maximum normalized distance among all the vehicles 119-139 from their destination and $w^m \geq 0$ is a weight encoding the priority of this term with respect to other terms. (13b) enables controlling of the vehicles 119-139 such that the last vehicle to reach its destination, reaches its destination as soon as possible, and as such enables optimizing the time of completion of the common objective for the specific group of individual vehicles considered in the optimization.

In some implementations, in both (13a) and (13b) the normalization may be removed.

Further, in some embodiments, when the CAV control signal u is a commanded velocity tracked by a CAV on-board velocity controller, a term $$\sum_{i \in I} w_i^u (|u_i(k|t) - v_{ref}|)^l \quad (13c)$$

sums differences between the commanded velocities and a desired velocity $v_{ref}$ in an area, where $w_i^u \geq 0$ are weights encoding the priorities of the vehicles 119-139 and a priority of this term with respect to other terms. (13c) is indicative of a difference between a commanded/current velocity and the desired velocity of each of the CAVs and the MCVs. (13c) enables controlling of the vehicles 119-139 such the vehicles 119-139 maintain a velocity close to the target velocity, and hence at avoiding slow-downs/speed-ups from such target velocity, with an effect to reducing accelerations/decelerations and idling, with consequences of reducing fuel consumption and emissions.

Further, a term $$\sum_{i \in I} w_i^\lambda (|\lambda_i(k|t) - \lambda_{ref}|)^l \quad (13d)$$

where $w_i^\lambda \geq 0$ are weights encoding the priorities of vehicles 119-139 and a priority of this term with respect to other terms. (13d) is indicative of a difference between a current lane and a desired lane of each of the CAVs and the MCVs. (13d) enables controlling of the vehicles 119-139 such that the vehicles 119-139 keep a lane as close as possible to the desired lane, e.g., the rightmost one. Furthermore, a term $$w^\psi \left(\left|\sum_{j,d} \psi_j^d(k|t) - \varsigma_{ref}\right|\right)^l \quad (13e)$$

where $w^\psi \geq 0$ is a weight encoding a priority of this term with respect to other terms. (13e) indicates a difference between a combination, specifically the sum, of the current state of all traffic signs and a desired value for such combination. (13e) enables controlling of the traffic signs such that their operation is as close as possible to a desired target, for instance a desired total number of green traffic lights.

Additionally, a term $$w^{\Delta \psi} \sum_{j,d} (|\psi_j^d(k|t) - \psi_j^d(k-1|t)|^l \quad (13f)$$

where $w^{\Delta \psi} \geq 0$ is a weight encoding a priority of this term with respect to other terms, penalizes a change of the traffic light status, e.g., from red to green and vice versa, and (13f) avoids excessively frequent changes to the traffic signs, which aims at ensuring traffic lights do not cycle too quickly as this can create undesired effects on MCV traffic such as excessive stop and go, which increases pollution due to idling engines.

Similarly to (13f), a term $$\sum_{i \in I} w_i^{\Delta \lambda} (|\lambda_i(k|t) - \lambda_i(k-1|t)|^l \quad (13g)$$

where $w_i^{\Delta \lambda}$ are $w_i^{\Delta \lambda} \geq 0$ are weights encoding a priority of this term with respect to other terms, penalizes a change of lanes of each vehicle, and (13f) prevents CAVs to change the lane, e.g., from left lane to right lane, which in turn avoids creating undesired effects on the MCV traffic, like excessive speed variations due to vehicles changing lanes in front. In some embodiments, reference values $v_{ref}$, $\lambda_{ref}$, $\zeta_{ref}$, vary depending on the zone, direction, vehicle, and time instant.

Further, according to an embodiment, a multi-variable mixed-integer problem (MIP) optimizing the cost function (12) is formulated as described below in FIG. 4.

Figure 4:
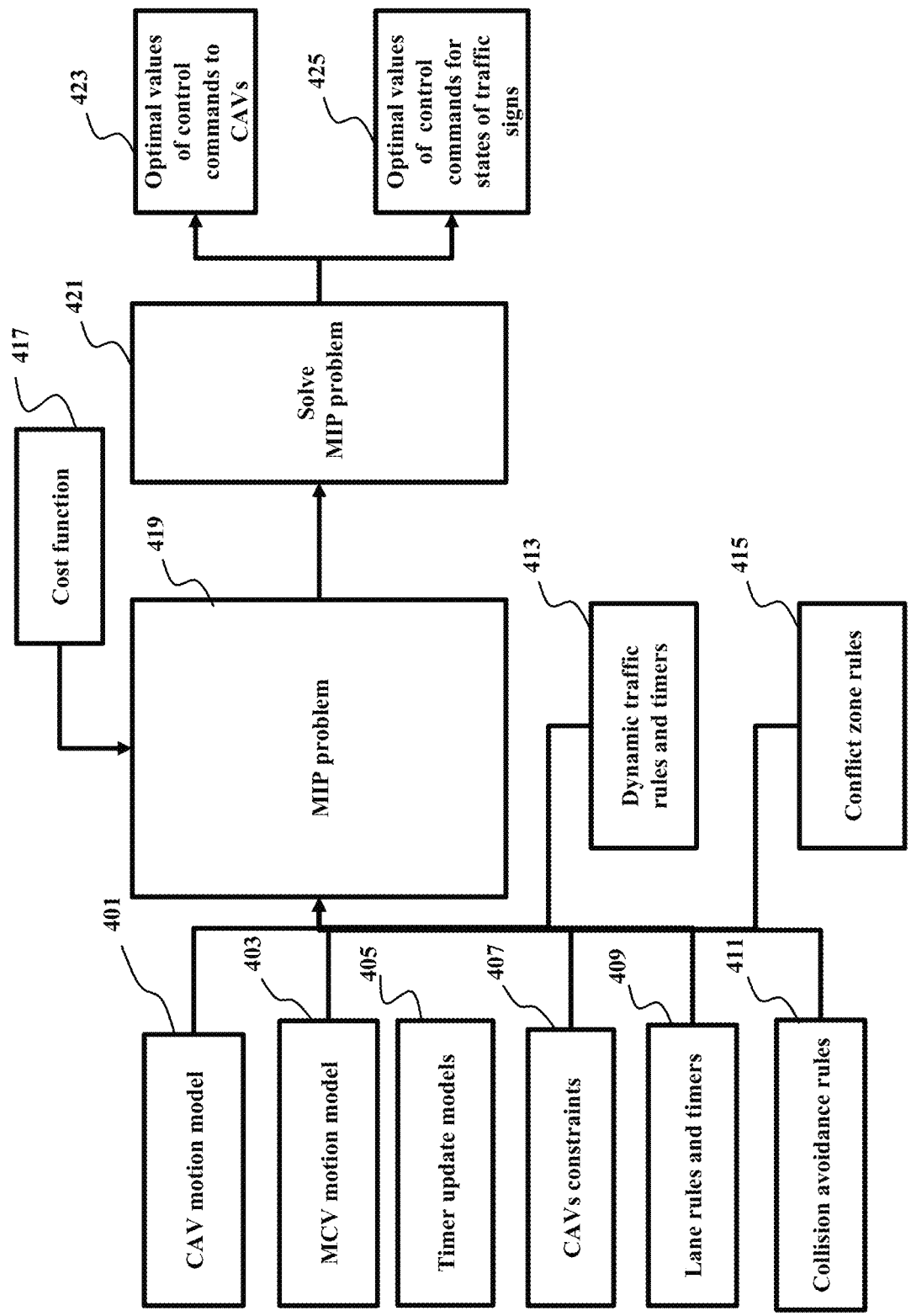
FIG. 4 shows a schematic for formulating a multi-variable mixed-integer problem (MIP), according to an embodiment of the present disclosure.

FIG. 4 shows a schematic for formulating an MIP problem 419, according to an embodiment of the present disclosure. The MIP problem 419 is formulated based on one or more of a CAV motion model (1) 401, an MCV motion model (10) 403, a timer update models (5) 405, CAVs constraints (2) 407, lane rules (6) and timers (7) 409, collision avoidance rules (9) 411, dynamic traffic rules (3) and timers (4) 413, conflict zone rules (8) 415, and a cost function (12) 417 including at least one of the terms (13a)-(13g) in the stage or terminal cost. For example, the MIP problem 419 optimizing the cost function (12) over a finite future prediction time interval, may be given as $$\min_{U_N, \Psi_N} J(P_N, \Lambda_N, U_N, \Psi_N) \quad (14)$$

s.t.(1), (2), $\forall i \in \mathcal{I}^c$ (5), $\forall v \in \Upsilon$ (3), (4)$\forall j \in \mathcal{J}^X, d \in \mathcal{D}(j)$ (6), (7)$\forall i \in \mathcal{I}^c, j \in \mathcal{J}, d \in \mathcal{D}(j)$ (8), $\forall i \in \mathcal{I}^c, \bar{l} \in \mathcal{I}, j \in \mathcal{J}^X, d, \bar{d} \in \mathcal{D}(j)$ (9), $\forall i \in \mathcal{I}^c, \bar{l} \in \mathcal{I}, j \in \mathcal{J}, d \in \mathcal{D}(j)$ (10), $\forall i \in \mathcal{I}^n$ $X(0|t) = X(t), \Theta(0|t) = \Theta(t), \Psi(0|t) = \Psi(t)$ where $X(t)$, $\Theta(t)$, $\Psi(t)$ are a set of states of the CAVs and the MCVs, a set of timer states, and a set of states of the traffic signs, at the planning time t, $\mathcal{I}, \mathcal{I}^c, \mathcal{I}^n, \mathcal{J}, \mathcal{J}^X, \mathcal{D}(j)$, are a set of all vehicles, a set of the CAVs, a set of the MCVs, a set of all zones, a set of conflict zones, a set of directions in the j-th zone, respectively.

Further, the MIP problem (14) may be solved 421 to determine optimal values of control commands 423 to the CAVs and optimal values of control commands 425 for the states of the traffic signs. For example, the traffic control system solves the MIP problem (14) and extracts from solution a sequence of optimal control commands to the CAVs $U^*_N = (U^*(0|t) \ldots U^*((N|t))$, and a sequence of optimal control commands for the states of the traffic signs $\Psi^*_N = (\psi^*(0|t), \ldots, \psi^*(N|t))$.

The sequence of control commands for the CAVs and the traffic signs are set as initial steps, $U(t) = U^*(0|t)$ and $\psi(t) = \psi^*(0|t)$, respectively. If new information is received, at next step t+1, the problem (14) is updated with new information and solved again. Otherwise, the next steps of the solution $U^*_N = (U^*(0|t) \ldots U^*((N|t))$ and $\psi^*_N = (\psi^*(0|t), \ldots, \psi^*(N|t))$ are used. In other embodiments, instead of extracting $U^*_N = (U^*(0|t) \ldots U^*((N|t))$, the traffic control system extracts and provides to the CAVs at least one of the elements of $p^*_{i,N} = (p^*_i(0|t) \ldots p^*_i(N|t))$ i∈ $\mathcal{I}^c$, a set of computed optimal positions, that can be achieved by on board control and planning algorithms.

In some other embodiments, the traffic control system computes the values of control commands for the CAVs and the traffic signs by solving a mixed-integer linear or quadratic program (MILP or MIQP). In such embodiments, the CAV motion models are described by linear systems such as $$p_i(t+1) = p_i(t) + v_i(t)T_s + (K_L v_i + F u_i)T_s^2/2$$

$$v_i(t+1) = v_i(t) + (K_L v_i + F u_i)T_s^2, \quad (15)$$

where $v_i$ is the velocity and $K_L$, $F_L$ are feedback and feedforward gains, and $T_s$ is a sampling period. The traffic control system selects the lane according to mixed-integer linear inequalities $$-1 + \lambda_i[(t)]_h + \Delta \lambda_i^+(t) \leq [\lambda_i(t+1)]_{h+1} \quad (16)$$

$$-1 + \lambda_i[(t)]_h + \Delta \lambda_i^-(t) \leq [\lambda_i(t+1)]_{h-1}$$

$$\lambda_i[(t)]_h - \Delta \lambda_i^-(t) - \Delta \lambda_i^+(t) \leq [\lambda_i(t+1)]_h$$

$$\sum_{h:[\lambda_i]_h \in \mathcal{S}_\lambda^d(j)} [\lambda_i(t)]_h = 1, \Delta \lambda_i^- + \Delta \lambda_i^+ \leq 1$$

where $\Delta \lambda_i^+$, $\Delta \lambda_i^-$ are Boolean variables indicating to move one lane to the left, and to the right, respectively. The traffic control system updates the values of the control commands for the traffic signs based on $$\psi_j^d(t+1) - \psi_j^d(t) \leq \Delta \psi_j^d(t) \leq \psi_j^d(t+1) + \psi_j^d(t)$$

$$\psi_j^d(t) - \psi_j^d(t+1) \leq \Delta \psi_j^d(t) \leq 2 - \psi_j^d(t+1) - \psi_j^d(t), \quad (17)$$

where $\Delta \psi_j^d$ is a Boolean command changing the state of the traffic sign, for instance, from red light to green light and vice versa. In an embodiment, traffic sign constraints are $$\sum_{d \in \mathcal{D}_j} \psi_j^d = 1 \quad (18)$$

for the case of the traffic light in the intersection. The timers for the traffic lights may be updated based on $$-M\Delta\psi_j^d(t) \leq \mathcal{J}_{\psi_j^d}(t+1) - \mathcal{J}_{\psi_j^d}(t) - T_s \leq M\Delta\psi_j^d(t)$$

$$-M(1-\Delta\psi_j^d(t)) \leq \mathcal{J}_{\psi_j^d}(t+1) \leq M(1-\Delta\psi_j^d(t)) \quad (19)$$

where M is a large constant, larger than any admissible value for the other variables. Constraints on the minimum and maximum change of the state of the traffic signs, such as traffic light, are $$\mathcal{J}_{\psi_j^d} \geq \mathcal{J}_{\psi_j^d}^{min} - M(1-\Delta\psi_j^d), \mathcal{J}_{\psi_j^d} \leq \mathcal{J}_{\psi_j^d}^{max} \quad (20)$$

The traffic control system implements constraints on the minimum time between two lane changes in a similar way using timer $\mathcal{J}_{\lambda_i}$, with $\Delta\lambda_i^+$, $\Delta\lambda_i^-$ as triggers for the timer reset.

For the conflict zones, such as the intersections, auxiliary integer membership variables $\delta_{ij}^d$ for i-th vehicle in j-th conflict zone in d-th direction are defined $$p_{ij}^{min} - M(1-\delta_{ij}^{in}) \leq p_i < p_{ij}^{min} + M\delta_{ij}^{in} \quad (21)$$

$$p_{ij}^{max} - M(1-\delta_{ij}^{out}) \geq p_i < p_{ij}^{max} - M\delta_{ij}^{out}|$$

$$\delta_{ij}^{in} + \delta_{ij}^{out} = 1 + \sum_{d \in \mathcal{D}_j} a_{ij}^d \delta_{ij}^d,$$

$p_{ij}^{min}$, $p_{ij}^{max}$ define at what distance on its route that the i-th vehicle enters in and exits in j-th conflict zone, and $a_{ij}^d$ defines which direction d the vehicle cross the conflict zone according to its routing information, and $\delta_{ij}^{in}$, $\delta_{ij}^{out}$ are integer variables indicating whether i-th vehicle entered and left j-th conflict zone, respectively. The traffic control system enforces a constraint on conflict zone crossing $$\sum_{i \in I} \delta_{ij}^d \leq C_j^d \psi_j^d, \quad (22)$$

where $C_j^d$ is capacity of the j-th conflict zone in d-th direction.

Further, in an embodiment, collision avoidance constraints are given by $$p_i(t+1) - p_{ij}^{min} x \quad (23)$$

$$\leq p_{\bar{i}}(t+1) - p_{\bar{i}j}^{min} + M(1 - \gamma_{i\bar{i}j}^{zn}) + M(1 - \gamma_{i\bar{i}}^{ah}) + M(1 - \gamma_{i\bar{i}}^{ln})$$

$$p_i(t) - p_{ij}^{min} > p_{\bar{i}}(t) - p_{\bar{i}j}^{min} - M\gamma_{i\bar{i}}^{ah}$$

$$\gamma_{i\bar{i}}^{ln} \geq [\lambda_i]_h + [\lambda_{\bar{i}}]_h - 1, \forall h \in \mathcal{S}_\lambda^d(j)$$

where $\gamma_{i\bar{i}}^{ah}$, $\gamma_{i\bar{i}}^{ln}$, $\gamma_{i\bar{i}j}^{zn}$ are indicators that i-th vehicle is ahead of ī-th vehicle, that they are in the same lane, and that i-th and ī-th vehicles are both in j-th zone, respectively. In (23) membership of the indicator variables are enforced in a same way as in (21).

The cost function (12) is formulated with at least one of the terms (13a)-(13e) in the terminal or stage cost as a quadratic or linear function $$J = z'Hz + z_0 C'z \quad (24)$$

where z is a vector grouping all variables in (12) and possibly some of the additional variables introduced in (15)-(23), and $z_0$ groups initial conditions of the variables in (12) at the current time step, and the cost function in (24) is linear if H=0, and quadratic otherwise.

Thus, in an embodiment, the MIP problem (14) may be formulated based on (15)-(23) as MILP/MIQP $$\min_z z'Hz + z_0 C'z \quad (25)$$

$$H_e z = K_e$$

$$H_i z \leq K_i$$

$$H_b z \in \{0, 1\}$$

where if the cost function (24) is linear, (25) is a MILP and otherwise is a MIQP, and the last inequality selects variables that are Boolean valued.

According to an embedment, the MIP problem (14) can be solved by using a branch-and-bound method.

Figure 5A:
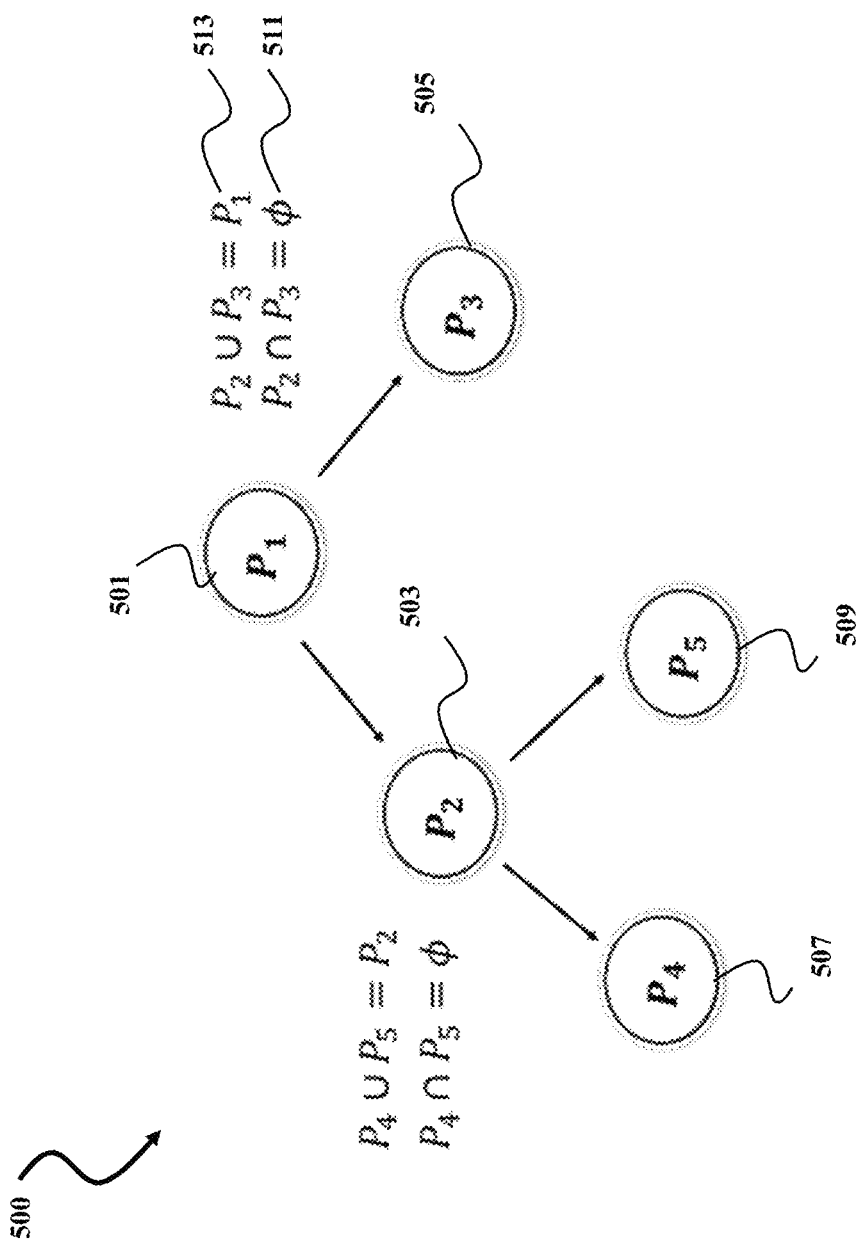
FIG. 5A illustrates a schematic of a branch-and-bound method, according to an embodiment of the present disclosure.

FIG. 5A illustrates a schematic of the branch-and-bound method, according to an embodiment of the present disclosure. The branch-and-bound method includes sequentially creating partitions of the MIP problem (14) and then solving those partitions, where each partition corresponds to a particular region of discrete optimization variable search space. In some embodiments, the branch-and-bound method includes selecting a partition or node and selecting discrete optimization variable to branch the selected partition into smaller partitions or search regions, resulting in a nested tree of partitions or search regions.

For example, a partition $P_1$ 501 represents a discrete search region that can be split or branched into two smaller regions $P_2$ 503 and $P_3$ 505 that are nested in a common region. The region $P_2$ 503 and the region $P_3$ 505 are disjoint, i.e., the intersection of these regions is empty $P_2 \cap P_3 = \phi$ 511, but the region $P_2$ 503 and the region $P_3$ 505 form original partition or region $P_1$, i.e., union $P_2 \cup P_3 = P_1$ 513 holds after branching. Further, an integer-relaxed optimization problem is solved for both the region $P_2$ 503 and the region $P_3$ 505, resulting in two solutions (local optimal solutions) that can be compared against each other and against a currently known upper bound value to an optimal objective value. The region $P_2$ 503 and/or the region $P_3$ 505 can be pruned if their performance metric is less optimal than the currently known upper bound value to the optimal objective value of the MIP problem (14). The upper bound value can be updated if the region $P_2$ 503, the region $P_3$ 505 or both the regions result in a discrete feasible solution to the MIP problem (14). Further, remaining region in the nested tree of partitions is selected for further partitioning.

While solving each partition/region may still be challenging, it is efficient to obtain local lower bounds on the optimal objective value, by solving local relaxations of the MIP problem (14) or by using duality. If a MIP problem solver obtains an integer-feasible solution while solving a local relaxation, the MIP problem solver can then use the obtained integer-feasible solution to obtain a global upper bound for a mixed-integer solution of the MIP problem (14). This may help to avoid solving or branching certain partitions that were already created, i.e., the already created partitions can be pruned. Such an algorithmic way of partitioning can be represented, in an embodiment, as a binary search tree 500, including a root node, e.g., $P_1$ 501 at the top of the tree 500, and leaf nodes, e.g., $P_4$ 507 and $P_5$ 509 at the bottom of the tree 500. In addition, nodes $P_2$ 503 and $P_3$ 505 are referred to as direct children of the root node $P_1$ 501, while the root node $P_1$ 501 is referred to as parent of the nodes $P_2$ 503 and $P_3$ 505. Similarly, nodes $P_4$ 507 and $P_5$ 509 are children of their parent node $P_2$ 503.

Figure 5B:
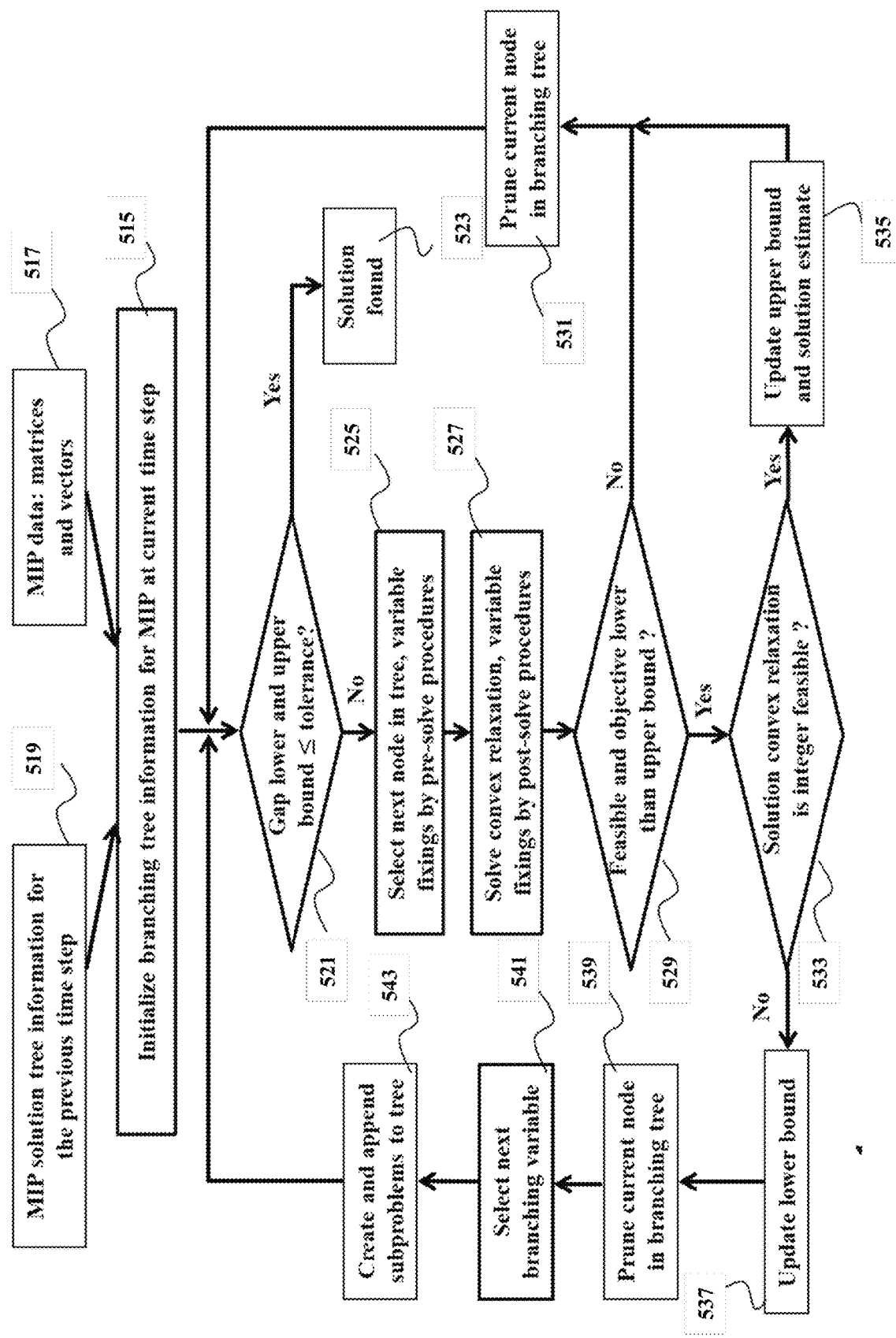
FIG. 5B illustrates a block diagram of a branch-and-bound mixed-integer optimization algorithm to search for a integer-feasible optimal solution based on a nested tree of search regions and corresponding lower/upper bounds, according to some embodiments of the present disclosure.

FIG. 5B illustrates a block diagram of a branch-and-bound mixed-integer optimization algorithm to search for a integer-feasible optimal solution based on a nested tree of search regions and corresponding lower/upper bounds, according to some embodiments of the present disclosure. At block 515, branching search tree information initialized for MIP at a current time step, based on MIP data 517 that includes matrices and vectors. The initialization can additionally use branching search tree information and MIP solution information from the previous time step 519 in order to generate a warm started initialization for the current time step. An objective of the branch-and-bound mixed-integer optimization algorithm is to determine lower and upper bounds on an objective value of the mixed-integer solution. At block 521, it is checked if a gap between the lower and upper bound is smaller than a tolerance value. If the gap is smaller than the tolerance value, then at block 523, it is construed that a mixed-integer optimal solution is determined.

If the gap is not smaller than the tolerance value, then at block 525, a next node in the nested tree, corresponding to the next region or partition of integer variable search space, is selected with possible variable fixings based on pre-solve branching techniques. After the node selection, at block 527, a corresponding integer-relaxed problem is solved, with possible variable fixings based on post-solve branching techniques.

If the integer-relaxed problem has a feasible solution, then a resulting relaxed solution provides the lower bound on the objective value for that particular region or partition of the integer variable search space. At block 529, if the objective value is determined to be larger than a currently known upper bound for the objective value of the mixed-integer solution, then, at block 531, the selected node is pruned or removed from branching tree. However, if the objective value is determined to be lower than the currently known upper bound, then, at block 533, it is checked if the relaxed solution is integer feasible. If the relaxed solution is integer feasible, then, at block 535, the currently known upper bound and corresponding mixed-integer solution estimate is updated.

If the integer-relaxed problem has a feasible solution and the objective value is lower than the currently known upper bound, but the relaxed solution is not yet integer feasible, then, at block 537, the lower bound is updated to be the minimum of the objective values for remaining leaf nodes in the branching tree and, at block 539, the selected node is pruned from the branching tree. In addition, starting from a current node, at block 541, a discrete variable with a fractional value is selected for branching according to a particular branching strategy, in order to create and append resulting subproblems, corresponding to regions or partitions of discrete search space, as children of that node in the branching tree, at block 543.

Some embodiments are based on branching one of binary optimization variables with fractional values in integer-relaxed solution. For example, if a binary optimization variable $d \in \{0,1\}$ has a fractional value as part of an integer-relaxed optimal solution, then two partitions of the mixed-integer problem are created by adding, respectively, an equality constraint $d=0$ to one sub-problem and an equality constraint $d=1$ to the other sub-problem. Some embodiments are based on a reliability branching strategy for variable selection, which aims to predict future branching behavior based on information from previous branching decisions.

Some embodiments are based on a branch-and-bound method that uses a depth-first node selection strategy, which can be implemented using a last-in-first-out (LIFO) buffer. The next node to be solved is selected as one of a children of the current node and this process is repeated until a node is pruned, i.e., the node is either infeasible, optimal or dominated by the currently known upper bound, which is followed by a backtracking procedure. Instead, some embodiments are based on a branch-and-bound method that uses a best-first strategy that selects a node with the currently lowest local lower bound. Some embodiments employ a combination of the depth-first and best-first node selection approach, in which the depth-first node selection approach is used until the integer-feasible solution is determined, followed by using the best-first node selection approach in the subsequent iterations of the branch-and-bound based optimization algorithm. The latter implementation is motivated by aiming to determine the integer-feasible solution early at start of the branch-and-bound procedure (depth-first) to allow for early pruning, followed by a greedy search for better feasible solutions (best-first).

The branch-and-bound mixed-integer optimization algorithm continues iterations until one or multiple termination conditions are satisfied. For example, the branch-and-bound mixed-integer optimization algorithm continues iterations until maximum execution time is reached, all the nodes in the branching tree have been pruned, such that no new node can be selected for solving convex relaxations or branching, and/or an optimality gap between the global lower and upper bounds for the objective value is smaller than the tolerance value.

In an embodiment, computations of the branch-and-bound method are reduced by fixing some of the variables to specific values based on the state of CAVs and MCVs, before executing the branch-and-bound method. For instance, if a CAV is far away from the intersection, for a distance longer than that transversable in the finite time of optimization horizon at the maximum speed according to the speed limits, the membership variables of the CAV in the intersection can be set according to the CAV not being in the intersection. Similarly, if a first CAV is faraway behind a second CAV, variables indicating that the first CAV has overtaken the second CAV can be set such that the overtake has not taken place. Similarly, if a MCV is far away from the intersections, all models related to operation of the MCV in the intersection can be ignored, and corresponding variables can be set such that those models are inactive.

Figure 6:
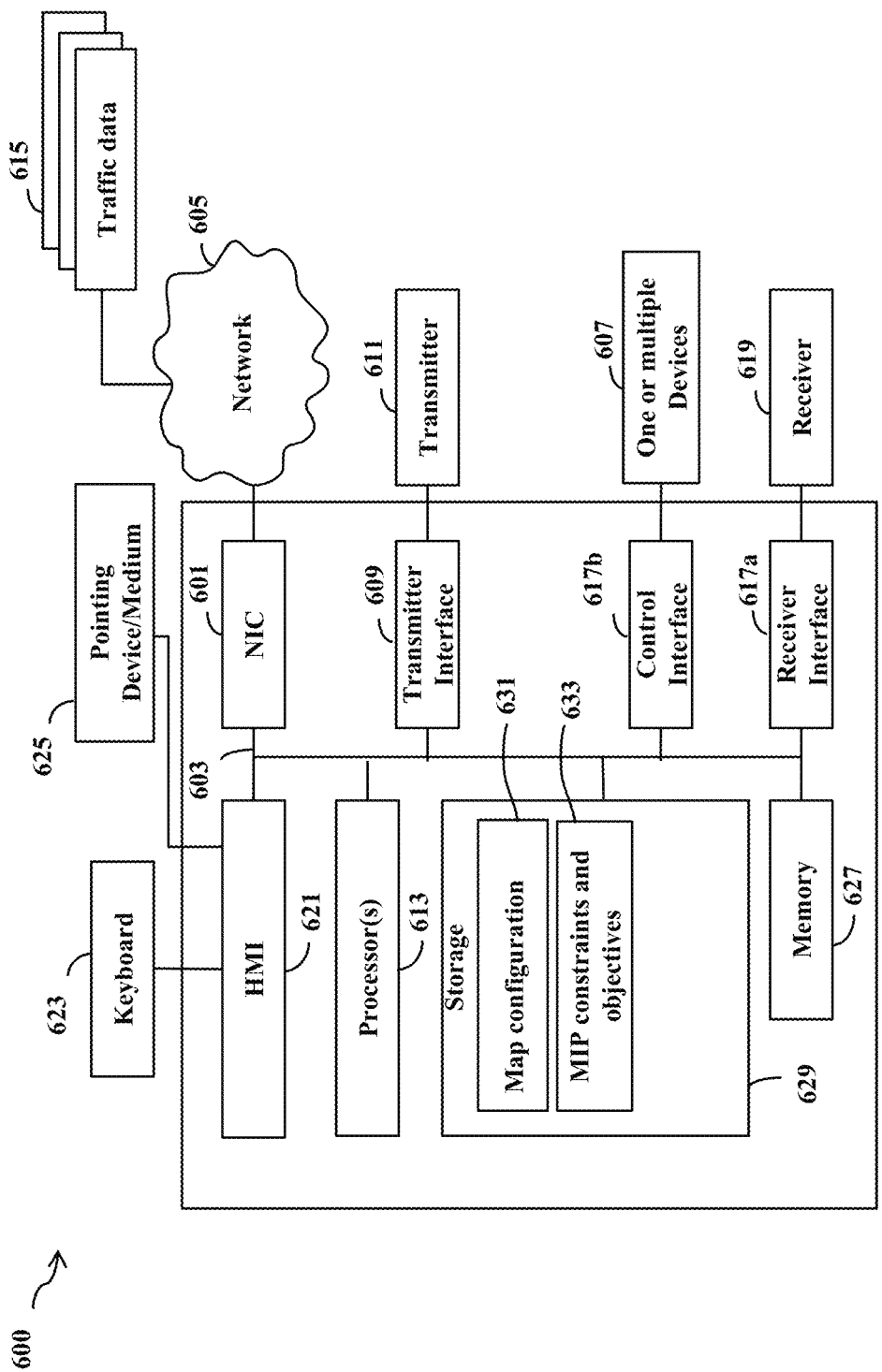
FIG. 6 shows a block diagram of a traffic control system for jointly controlling connected autonomous vehicles and manual connected vehicles, according to an embodiment of the present disclosure.

FIG. 6 shows a block diagram of the traffic control system, according to an embodiment of the present disclosure. The traffic control system 600 is executed either in cloud or in one or multiple mobile edge computers (MECs). The traffic control system 600 may additionally require one or multiple edge infrastructure devices (e.g., RSUs for infrastructure-based sensing) comprised of a set of sensors or be operatively connected to the set of sensors to collect digital representation of states of each of the CAVs, each of the MCVs, and each of the traffic signs regulating the traffic.

The traffic control system 600 comprises a number of interfaces connecting the traffic control system 600 with other systems and devices. For example, the traffic control system 600 comprises a network interface controller (NIC) 601 that is adapted to connect the traffic control system 600 through a bus 603 to a network 605 connecting the traffic control system 600 with one or multiple devices 606. Examples of such devices include, but are not limited to, vehicles, traffic lights, traffic sensors, road-side units (RSUs), mobile edge computers (MECs), and passengers' mobile devices.

Through the network 605, the traffic control system 600 receives real-time traffic data 615 using a receiver interface 617a connected to a receiver 619. The traffic data 615 includes the digital representation of the states of each of the CAVs, each of the MCVs, and each of the traffic signs. Additionally, or alternatively, the traffic control system 600 can include a control interface 617b configured to transmit the control commands to the one or multiple devices 606 to change their respective state, such as acceleration, velocity, light-on states and the like. The control interface 617b may use a transmitter 611 to transmit the control commands and/or any other communication means.

In some embodiments, a human machine interface (HMI) 621 connects the traffic control system 600 to a keyboard 623 and a pointing device 625, wherein the pointing device 625 can include a mouse, trackball, touchpad, joy stick, pointing stick, stylus, or touchscreen, among others. The traffic control system 600 can also be linked through the bus 603 to a display interface adapted to connect the traffic control system 600 to a display device, such as a computer monitor, camera, television, projector, or mobile device, among others. The traffic control system 600 can also be connected to an application interface adapted to connect the traffic control system 600 to one or more equipment for performing various power distribution tasks.

The traffic control system 600 includes a processor(s) 613 and a memory 626 that stores instructions that are executable by the processor(s) 613. The processor(s) 613 can be a single core processor, a multi-core processor, a computing cluster, a network of multiple connected processors, or any number of other configurations. The memory 626 can include random access memory (RAM), read only memory (ROM), flash memory, or any other suitable memory systems. The processor(s) 613 can be connected through the bus 603 to one or more input and output devices. The stored instructions implement a method for jointly controlling the CAVs and the MCVs. In some embodiments the traffic control system 600 includes a storage device that stores a map configuration 631. For example, the map configuration 631 can include location data (e.g., GPS data) for the conflict-free road segments, conflict zones and track lanes within each of the road segments of the transportation network.

Additionally, the storage device 629 is configured to store MIP constraints and objectives 633 of the (MIP) problem (14) that is solved at each time step. For example, the MIP constraints and objectives 633 can be configured to enforce physical limitations, vehicle speed limits and/or safety constraints, timing constraints of timer of actions, and to minimize a weighted combination of distance from target, difference from velocity reference, energy consumption for each of the vehicles or for a group of vehicles in the transportation network. In some embodiments, the MIP constraints and objectives 633 lead to a solution of MILP/MIQP problem.

The processor(s) 613 is configured to solve a multi-variable mixed-integer problem (MIP) optimizing over a finite future prediction time interval a cost function for values of control commands changing states of each of the CAVs and values of control commands changing states of each of the traffic. The cost function of individual goals of each CAV and MCV and a common goal for individual group of the CAVs and the MCVs is optimized subject to a motion model of each of the CAVs described by a differential equation relating a control command to a CAV with a change of a state of the CAV, subject to constraints modeling general traffic rules, subject to timing constraints, and subject to a motion model of each of the MCVs described by a switch function relating a dynamic traffic rule for an MCV with a state of the MCV and a state of each of the traffic signs. Further, the optimized values of control commands are transmitted to the corresponding CAVs and corresponding traffic signs, using a transmitter interface 609.

In each of the CAVs, the optimized values of control commands received can be used by a multi-layer guidance and control architecture to control the motion of the CAV in order to improve overall safety, time and energy efficiency of traffic flow of the vehicles operating in the transportation network.

Figure 7A:
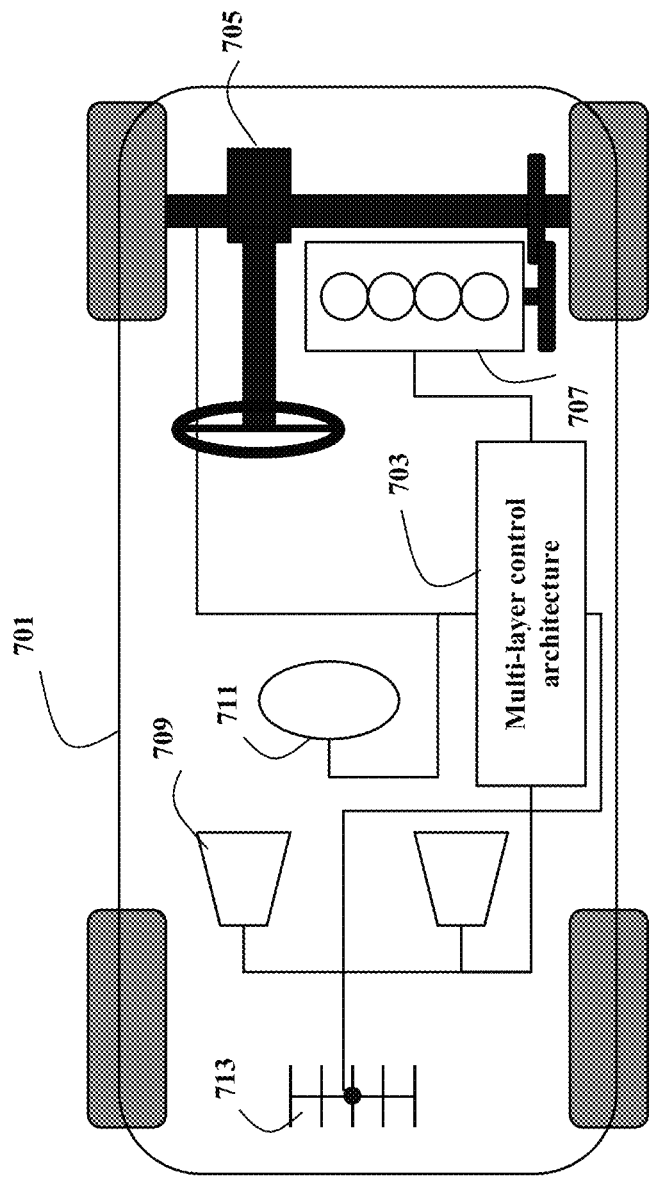
FIG. 7A illustrates a schematic of a vehicle including a multi-layer guidance and control architecture employing principles of some embodiments.

FIG. 7A illustrates a schematic of a vehicle 701 including a multi-layer guidance and control architecture 703, according to some embodiments of the present disclosure. The multi-layer guidance and control architecture 703 controls the vehicle 701 based on the control commands received from the traffic control system 600. As used herein, the vehicle 701 is one of the CAVs in the transportation network. The vehicle 701 includes a steering system 705 and an engine or a motor 707, which can be controlled directly by the multi-layer guidance and control architecture 703 or by other components of the vehicle 701.

The vehicle 701 can also include one or more on-board sensors 709 to sense surrounding environment. Examples of the sensors 709 include distance range finders, radars, lidars, and cameras. The vehicle 701 can also include one or more on-board sensors 711 to sense its current motion quantities and internal status. Examples of the sensors 711 include global positioning system (GPS), accelerometers, inertial measurement units, gyroscopes, shaft rotational sensors, torque sensors, deflection sensors, pressure sensors, and flow sensors. The on-board sensors provide information to the multi-layer guidance and control architecture 703. The vehicle can be equipped with a transceiver 713 enabling communication capabilities for the multi-layer guidance and control architecture 703 through wired or wireless communication channels, e.g., for the vehicle 701 to communicate with the traffic control system 600.

Figure 7B:
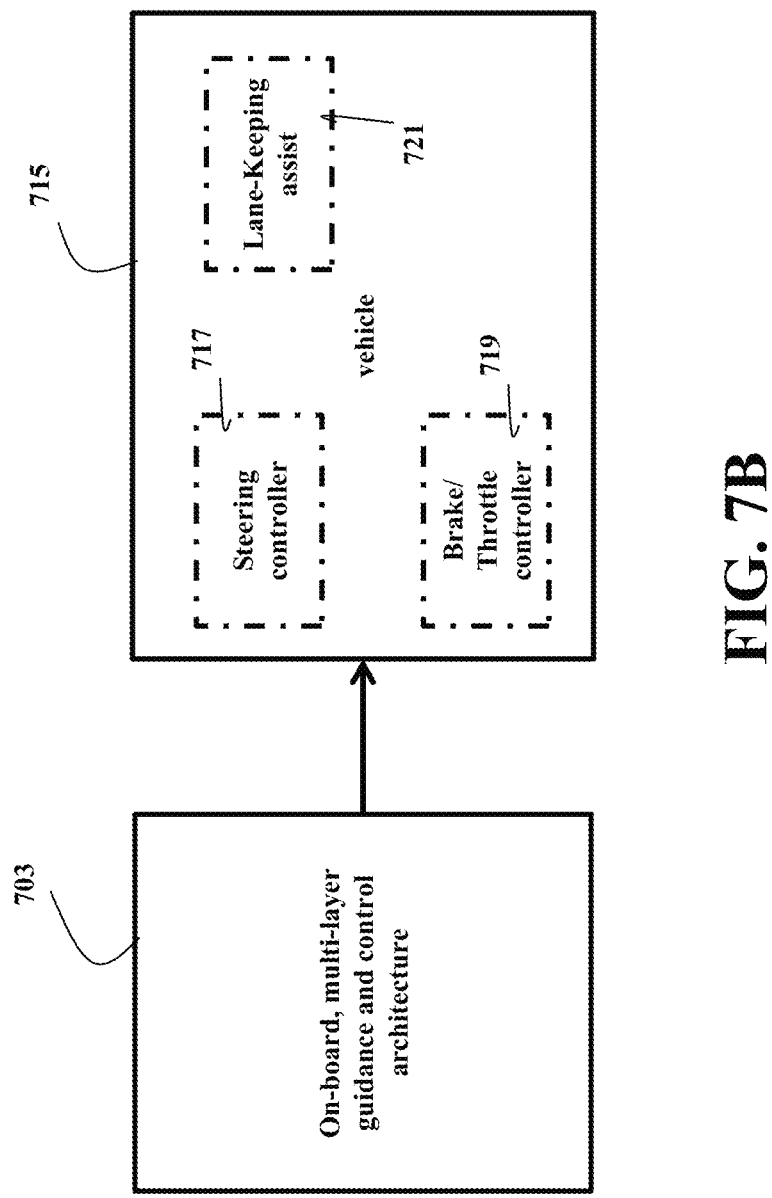
FIG. 7B illustrates a schematic of interaction between the multi-layer guidance and control architecture and other controllers of the vehicle, according to an embodiment of the present disclosure.

FIG. 7B illustrates a schematic of interaction between the multi-layer guidance and control architecture 703 (i.e., layers of algorithms and technologies for decision making, motion planning, vehicle control and/or estimation) and other controllers 715 of the vehicle 701, according to some embodiments of the present disclosure. For example, in some embodiments, the controllers 715 of the vehicle 701 are steering controller 717 and brake/throttle controllers 719 that control rotation and acceleration of the vehicle 701, respectively. In such a case, the multi-layer guidance and control architecture 703 outputs control inputs to the controllers 717 and 719 to control a state of the vehicle 701. The controllers 715 can also include high-level controllers, e.g., a lane-keeping assist controller 721, that further process the control inputs of the multi-layer guidance and control architecture 703. In both cases, the controllers 715 use the outputs of the multi-layer guidance and control architecture 703 to control at least one actuator of the vehicle 701, such as steering and/or brakes of the vehicle 701, in order to control motion of the vehicle 701. In some embodiments, the multi-layer guidance and control architecture 703 determines an input to the vehicle 701 based on the control commands received from the traffic control system 600, where the input to the vehicle 701 can include one or a combination of an acceleration of the vehicle 701, an engine torque of the vehicle 701, brake torques, and a steering angle.

Figure 8A:
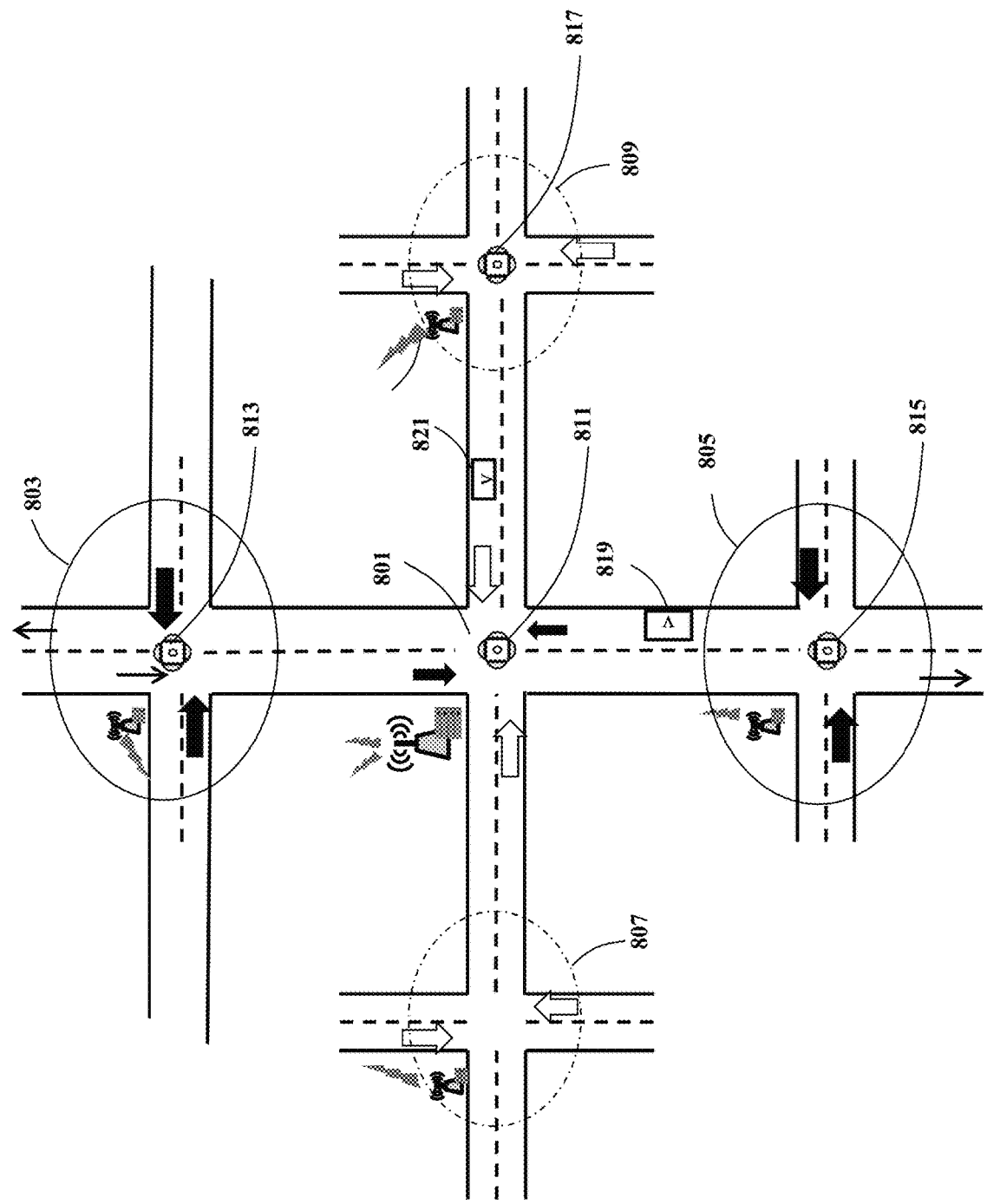
FIG. 8A shows an application of the traffic control system in transportation network including multiple interconnected intersections, according to an embodiment of the present disclosure.

FIG. 8A shows an application of the traffic control system 600 in transportation network including multiple interconnected intersections 801, 803, 805, 807 and 809, according to an embodiment of the present disclosure. The overall safety, time efficiency and energy efficiency of the traffic flow in this transportation network can be controlled by the traffic control system 600, according to embodiments of this invention. In some embodiments, the traffic control system 600 computes a coarse motion plan for each CAV in the transportation network along its route from the current position of the CAV to a desired destination of the CAV and at the same time computes the control commands for the controllable traffic rules (CTRs) that affect both CAVs and MCVs. The CTRs refers to the dynamic traffic rules. The coarse motion plan can include a sequence of entering and exit times and of average velocity values for each CAV at each intersection along the CAV's route from its current position to its desired destination. Furthermore the traffic control system 600 controls CTRs 811, 813, 815, 817 in the entire area, thus affecting behaviors of CAVs and MCVs. CTRs may not need to be present on all intersections, as, for instance, the intersection 807 does not have a CTR.

In an illustrative example scenario in FIG. 8A, traffic in a north-south direction at the intersections 803 and 805 is more highly congested than traffic in an east-west direction at the intersections 807 and 809. The traffic control system 600 controls planned future timing and velocity trajectories for CAVs (e.g., a vehicle 819) that plan to cross the intersection 801 and plan to travel towards south-north direction of the intersection 803, which is highly congested. To improve overall safety, time efficiency and energy efficiency of traffic flow in the transportation network, the traffic control system 600 commands that the vehicle 819 to slow down its speed before and/or after crossing the intersection 801, such that the vehicle 819 is predicted to arrive at the intersection 803 at a later time in order to reduce the traffic congestion at the intersection 803 and in order to reduce overall waiting time for one or multiple of the vehicles in the transportation network.

Additionally, the traffic control system 600 also controls the CTRs. For instance, it may reduce green light duration of CTR traffic lights 811, 813, 815 in the east-west direction, and hence increase the green light duration in the north south direction, so that the more congested north-south direction is allowed to flow more so that traffic the congestion should reduce. However, the traffic control system 600 may enable the green light to be turn on in 811, 813, 815, exactly when specific vehicles such as 819 are able to pass through, as opposed to in a way related to average traffic. This allows to enable green lights when needed according to the specific vehicle objectives. For instance, the CTR 811 may be green in East-west direction, but may be turned red when MCV 821 approaches and the vehicle 819 is also approaching, so that MCV 821 stops to let the vehicle 819 pass.

Figure 8B:
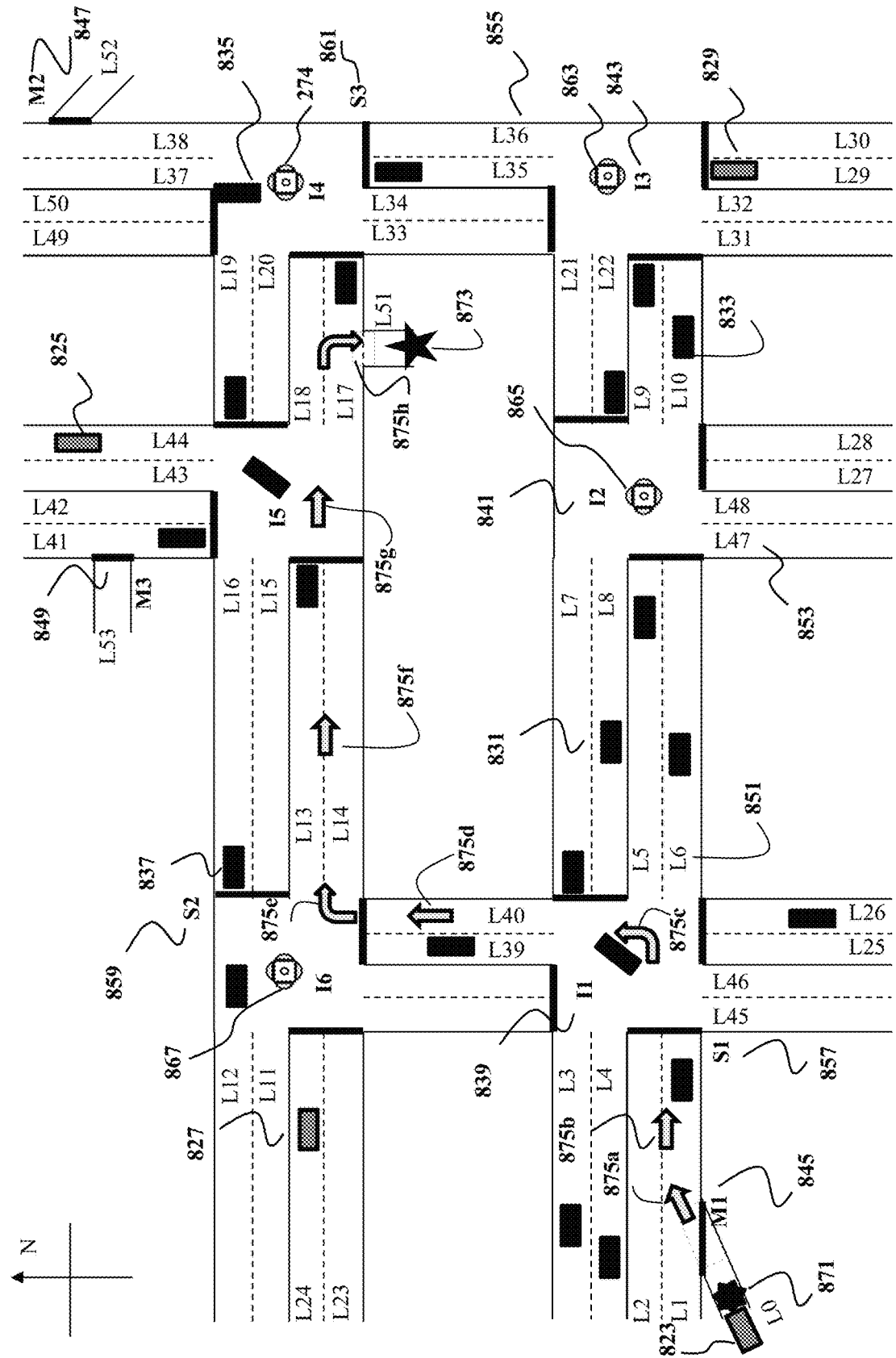
FIG. 8B illustrates an exemplary traffic scene, within a transportation network of multiple interconnected intersections and merging points, according to an embodiment of the present disclosure.

FIG. 8B illustrates an exemplary traffic scene, within a transportation network of multiple interconnected intersections and merging points, according to an embodiment of the present disclosure. The transportation network includes one or multiple controlled vehicles, referred to as CAVs, e.g., 823, 825, 827 and 829, and including one or multiple non-controlled traffic participants, such as MCVs 831, 833, 835 and 837. The transportation network itself may include multiple interconnected intersections, such as 839 (I1), 841 (I2) and 843 (I3), as well as multiple interconnected merging points, such as 845 (M1), 847 (M2) and 849 (M3). Both intersections and merging points are referred to as conflict zones. The conflict zones are interconnected by multiple conflict-free road segments that each may include one or multiple lanes, for example, 851 (L6), 853 (L47) and 855 (L36). In addition, FIG. 8B depicts stop lines that denote a position for the vehicles to potentially wait for a particular time period before entering an intersection, for example, stop lines 857 (S1), 859 (S2) and 861 (S3). Further, CTRs may be present, such as 863-869 as controlled traffic lights in some of the intersections.

FIG. 8B additionally illustrates routing information that may be provided by a routing or navigation module for each of the CAVs, e.g., for the vehicle 823. For the vehicle 823 in current position 871, and with desired destination 873, a routing or navigation module provides a sequence of roads and turns indicated by arrows 875*a*-875*g* for the vehicle 823. Similarly, the same or different individual routing or navigation modules can provide the sequence of roads and turns from the current position to the desired destination for other vehicles, e.g., for the CAVs 825, 827 and 829.

However, it may be noted that the sequence of roads and turns 875*a*-875*g* by itself does not yet specify a motion plan or a path for the vehicle 823. There are a number of discrete decisions to take such as in what lane the vehicle is to drive, if the vehicle should change lane or stay in a current lane, if the vehicle should start decelerating to stop at the stop line or not, if the vehicle is allowed to cross the intersection, and so on. Furthermore, there are a number of continuous decisions to make, such as timed sequence of positions and orientations that the vehicle should achieve on the travel from its initial point to its destination. Furthermore, it is also necessary to decide behavior of the CTRs which affect operation of both CAVs and MCVs. According to some embodiments, a motion plan, which includes a sequence of one or multiple of the aforementioned discrete and/or continuous decisions along the route from the current position to the desired destination, can be computed by the traffic control system 600 for one or multiple CAVs, e.g., 823-829 and the CTRs 863-869.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A traffic control system for jointly controlling one or multiple connected autonomous vehicles (CAVs) and one or multiple manual connected vehicles (MCVs) moving to form traffic on same or intersecting roads, comprising:
   at least one processor; and
   a memory having instructions stored thereon that, when executed by the at least one processor, causes the traffic control system to:
   collect digital representation of states of each of the CAVs, each of the MCVs, and each of traffic signs regulating the traffic;
   solve a multi-variable mixed-integer problem optimizing over a finite future prediction time interval a cost function for values of control commands changing states of each of the CAVs and values of control commands changing states of each of the traffic signs, wherein the cost function of individual goals of each CAV and MCV and a common goal for individual group of the CAVs and the MCVs is optimized subject to a motion model of each of the CAVs described by a differential or difference equation relating a control command to a CAV with a change of a state of the CAV, subject to constraints modeling general traffic rules, subject to timing constraints, and subject to a motion model of each of the MCVs described by a switch function relating dynamic traffic rules for an MCV with a state of the MCV and a state of each of the traffic signs;
   transmit optimized values of control commands to corresponding CAVs and corresponding traffic signs; and
   control the CAVs and traffic signs based on the optimized values of the control commands.

2. The traffic control system of claim 1, wherein the switch function includes a rule-free motion model unaffected by the dynamic traffic rules, and one or multiple rule-restricted motion models.

3. The traffic control system of claim 2, wherein a rule-restricted motion model of the one or multiple rule-restricted motion models is selected for a MCV, based on the states of each of the traffic signs and a state of the MCV.

4. The traffic control system of claim 2, wherein each rule-restricted motion model is independent of the states of each of the traffic signs.

5. The traffic control system of claim 1, wherein the cost function includes a term indicative of a difference between a current velocity and a desired velocity of each of the CAVs and the MCVs.

6. The traffic control system of claim 1, wherein the cost function includes a term indicative of a difference between a current lane and a desired lane of each of the CAVs and the MCVs.

7. The traffic control system of claim 1, wherein the cost function includes a term indicative of a difference between a combination of current states of the traffic signs and a desired value for the combination.

8. The traffic control system of claim 1, wherein the cost function includes a term that penalizes a change of a traffic sign state.

9. The traffic control system of claim 1, wherein the cost function includes a term that penalizes a change of a lane of each vehicle.

10. The traffic control system of claim 1, wherein the timing constraints include at least one of a timer enabling or disabling a change of the traffic signs and a timer enabling or disabling a change of CAV driving lane.

11. The traffic control system of claim 1, wherein the multi-variable mixed-integer problem is one of a mixed-integer linear program (MILP) or a mixed-integer quadratic program (MIQP).

12. The traffic control system of claim 1, wherein the processor is further configured to solve the multi-variable mixed-integer problem, based on a branch-and-bound algorithm.

13. The traffic control system of claim 12, wherein the branch-and-bound algorithm includes fixing at least one variable, based on the states of each of the CAVs and the MCVs.

14. The traffic control system of claim 1, wherein the general traffic rules includes one or more of rules of crossing intersections, avoiding collision with neighbor vehicles, occupying an open lane, and satisfying lane speed limit.

15. The traffic control system of claim 1, wherein the dynamic traffic rules correspond to traffic signs which change based on corresponding control commands.

16. The traffic control system of claim 15, wherein the traffic signs include one or more of a traffic light, a variable speed limit, and a lane access status.

17. The traffic control system of claim 1, wherein the state of the CAV includes one or more of a position, a velocity, an acceleration, and a lane of the CAV, and wherein the state of the MCV includes one or more of a position, a velocity, an acceleration, and a lane of the MCV.

18. The traffic control system of claim 1, wherein the states of each of the traffic signs includes one or more of a traffic light status, a value of variable speed limit, and a lane access status.

19. A method for jointly controlling one or multiple connected autonomous vehicles (CAVs) and one or multiple manual connected vehicles (MCVs) moving to form traffic on same or intersecting roads, the method comprising:

collecting digital representation of states of each of the CAVs, each of the MCVs, and each of traffic signs regulating the traffic;

solving a multi-variable mixed-integer problem (MIP) optimizing over a finite future prediction time interval a cost function for values of control commands changing states of each of the CAVs and values of control commands changing states of each of the traffic signs, wherein the cost function of individual goals of each CAV and MCV and a common goal for individual group of the CAVs and the MCVs is optimized subject to a motion model of each of the CAVs described by a differential equation relating a control command to a CAV with a change of a state of the CAV, subject to constraints modeling general traffic rules, subject to timing constraints, and subject to a motion model of each of the MCVs described by a switch function relating a dynamic traffic rule for an MCV with a state of the MCV and a state of each of the traffic signs;

transmitting optimized values of the control commands to corresponding CAVs and corresponding traffic signs; and controlling the CAVs and traffic signs based on the optimized values of the control commands.

20. A non-transitory computer-readable storage medium embodied thereon a program executable by a processor for performing a method for jointly controlling one or multiple connected autonomous vehicles (CAVs) and one or multiple manual connected vehicles (MCVs) moving to form traffic on same or intersecting roads, the method comprising:

collecting digital representation of states of each of the CAVs, each of the MCVs, and each of traffic signs regulating the traffic;

solving a multi-variable mixed-integer problem (MIP) optimizing over a finite future prediction time interval a cost function for values of control commands changing states of each of the CAVs and values of control commands changing states of each of the traffic signs, wherein the cost function of individual goals of each CAV and MCV and a common goal for individual group of the CAVs and the MCVs is optimized subject to a motion model of each of the CAVs described by a differential equation relating a control command to a CAV with a change of a state of the CAV, subject to constraints modeling general traffic rules, subject to timing constraints, and subject to a motion model of each of the MCVs described by a switch function relating a dynamic traffic rule for an MCV with a state of the MCV and a state of each of the traffic signs;

transmitting optimized values of the control commands to corresponding CAVs and corresponding traffic signs; and controlling the CAVs and traffic signs based on the optimized values of the control commands.

* * * * *